United States Patent
Darbee et al.

[19]

[11] Patent Number: 6,130,726
[45] Date of Patent: Oct. 10, 2000

[54] PROGRAM GUIDE ON A REMOTE CONTROL DISPLAY

[75] Inventors: Paul V. Darbee, Santa Ana; John R. Thompson, La Quinta; Brandt J. Thompson, Newport Coast, all of Calif.; Frank A. O'Donnell, Summerlin, Nev.

[73] Assignee: Evolve Products, Inc., Irvine, Calif.

[21] Appl. No.: 09/080,315

[22] Filed: May 15, 1998

Related U.S. Application Data

[63] Continuation-in-part of application No. 09/010,093, Jan. 21, 1998, and application No. 08/999,716, Oct. 6, 1997, which is a continuation of application No. 08/823,507, Mar. 24, 1997, abandoned.

[51] Int. Cl.[7] ........................................... H04N 5/44
[52] U.S. Cl. ........................ 348/734; 348/906; 348/1
[58] Field of Search ................................ 348/734, 906, 348/12, 13, 6, 7, 10, 2, 1, 3, 4, 5; 455/4.2, 5.1, 6.1, 6.2, 6.3, 2; H04N 7/16, 5/44

[56] References Cited

U.S. PATENT DOCUMENTS

| | | | |
|---|---|---|---|
| Re. 33,369 | 10/1990 | Hashimoto | 379/104 |
| 3,597,531 | 8/1971 | De Marinis et al. | 178/5.8 R |
| 4,287,676 | 9/1981 | Weinhaus | 40/10 R |
| 4,377,870 | 3/1983 | Anderson et al. | 455/2 |
| 4,392,022 | 7/1983 | Carlson | 179/2 TV |
| 4,475,123 | 10/1984 | Dumbauld et al. | 358/114 |
| 4,567,512 | 1/1986 | Abraham | 358/86 |
| 4,592,546 | 6/1986 | Fascenda et al. | 273/1 E |
| 4,623,887 | 11/1986 | Welles, II | 340/825.57 |
| 4,712,105 | 12/1987 | Kohler | 340/825.69 |
| 4,728,949 | 3/1988 | Platte et al. | 340/825.37 |
| 4,746,919 | 5/1988 | Reitmeier | 340/825.56 |
| 4,774,511 | 9/1988 | Rumbolt et al. | 340/825.69 |
| 4,792,972 | 12/1988 | Cook, Jr. | 380/20 |
| 4,807,031 | 2/1989 | Broughton et al. | 358/142 |
| 4,825,200 | 4/1989 | Evans et al. | 341/23 |
| 4,866,434 | 9/1989 | Keenan | 340/825.72 |
| 4,876,592 | 10/1989 | Von Kohorn | 358/84 |
| 4,888,709 | 12/1989 | Revesz et al. | 364/518 |
| 4,899,370 | 2/1990 | Kameo et al. | 379/104 |
| 4,918,439 | 4/1990 | Wozniak et al. | 340/825.69 |
| 4,959,810 | 9/1990 | Darbee et al. | 364/900 |
| 4,962,466 | 10/1990 | Revesz et al. | 364/518 |
| 5,001,554 | 3/1991 | Johnson et al. | 358/86 |
| 5,016,272 | 5/1991 | Stubbs et al. | 380/5 |
| 5,033,079 | 7/1991 | Catron et al. | 379/100 |
| 5,046,093 | 9/1991 | Wachob | 380/20 |
| 5,065,235 | 11/1991 | Iijima | 358/86 |
| 5,089,885 | 2/1992 | Clark | 358/86 |
| 5,128,752 | 7/1992 | Von Kohorn | 358/84 |
| 5,132,679 | 7/1992 | Kubo et al. | 340/825.22 |
| 5,151,789 | 9/1992 | Young | 358/194.1 |
| 5,204,768 | 4/1993 | Tsakiris et al. | 359/148 |
| 5,206,722 | 4/1993 | Kwan | 358/86 |

(List continued on next page.)

FOREIGN PATENT DOCUMENTS

| | | |
|---|---|---|
| WO 93/12612 | 6/1993 | WIPO . |
| WO 94/15417 | 7/1994 | WIPO . |
| WO 95/01057 | 1/1995 | WIPO . |
| WO 92/32563 | 11/1995 | WIPO . |
| WO 95/32583 | 11/1995 | WIPO . |
| WO 97/33434 | 9/1997 | WIPO . |

*Primary Examiner*—Chris Grant
*Attorney, Agent, or Firm*—Lyon & Lyon LLP

[57] ABSTRACT

A remote control for operating a consumer electronic device. The remote control device may comprise a housing providing a mounting for a visual display and a keyboard including a plurality of keys; electrical circuitry in the housing including a microprocessor, at least one of an IR or RF receiver circuit coupled to the microprocessor, keyboard circuitry coupled between the microprocessor and the keyboard, a memory coupled to the microprocessor, and at least one of an IR or RF transmitter circuit coupled to the microprocessor. Program guide software is stored in the memory and executable by the microprocessor for causing to be displayed on the visual display, upon actuation of one or more of the keys, a program guide, advertising and/or other content contained in a data set received by the receiver.

20 Claims, 24 Drawing Sheets

U.S. PATENT DOCUMENTS

| | | | |
|---|---|---|---|
| 5,220,420 | 6/1993 | Hoarty et al. | 358/86 |
| 5,237,327 | 8/1993 | Saitoh et al. | 341/176 |
| 5,249,044 | 9/1993 | Von Kohorn | 358/86 |
| 5,255,313 | 10/1993 | Darbee | 379/102 |
| 5,282,028 | 1/1994 | Johnson et al. | 358/86 |
| 5,287,181 | 2/1994 | Holman | 348/473 |
| 5,297,204 | 3/1994 | Levine | 380/10 |
| 5,367,316 | 11/1994 | Ikezaki | 345/158 |
| 5,381,991 | 1/1995 | Stocker | 248/206.5 |
| 5,382,947 | 1/1995 | Thaler et al. | 340/825.22 |
| 5,410,326 | 4/1995 | Goldstein | 348/134 |
| 5,416,535 | 5/1995 | Sato et al. | 348/706 |
| 5,446,551 | 8/1995 | Kawaguchi et al. | 358/335 |
| 5,450,079 | 9/1995 | Dunaway | 341/23 |
| 5,455,570 | 10/1995 | Cook et al. | 340/825.22 |
| 5,483,276 | 1/1996 | Brooks et al. | 348/2 |
| 5,500,681 | 3/1996 | Jones | 348/473 |
| 5,502,504 | 3/1996 | Marshall et al. | 348/565 |
| 5,504,475 | 4/1996 | Houdou et al. | 340/825.35 |
| 5,515,106 | 5/1996 | Chaney et al. | 348/461 |
| 5,515,270 | 5/1996 | Weinblatt | 364/405 |
| 5,517,254 | 5/1996 | Monta et al. | 348/569 |
| 5,523,794 | 6/1996 | Mankovitz et al. | 348/460 |
| 5,523,796 | 6/1996 | Marshall et al. | 348/589 |
| 5,524,195 | 6/1996 | Clanton, III et al. | 395/155 |
| 5,528,304 | 6/1996 | Cherrick et al. | 348/565 |
| 5,532,732 | 7/1996 | Yuen et al. | 348/1 |
| 5,537,106 | 7/1996 | Mitsuhashi | 340/825.72 |
| 5,537,107 | 7/1996 | Funado | 340/825.72 |
| 5,539,393 | 7/1996 | Barfod | 340/825.52 |
| 5,557,338 | 9/1996 | Maze et al. | 348/565 |
| 5,557,721 | 9/1996 | Fite et al. | 395/148 |
| 5,559,548 | 9/1996 | Davis et al. | 348/6 |
| 5,566,353 | 10/1996 | Cho et al. | 455/2 |
| 5,576,755 | 11/1996 | Davis et al. | 348/13 |
| 5,576,768 | 11/1996 | Gomikawa | 348/468 |
| 5,579,055 | 11/1996 | Hamilton et al. | 348/476 |
| 5,585,838 | 12/1996 | Lawler et al. | 348/13 |
| 5,585,866 | 12/1996 | Miller et al. | 348/731 |
| 5,589,892 | 12/1996 | Knee et al. | 348/731 |
| 5,592,551 | 1/1997 | Lett et al. | 380/20 |
| 5,596,373 | 1/1997 | White et al. | 348/569 |
| 5,600,573 | 2/1997 | Hendricks et al. | 364/514 R |
| 5,603,078 | 2/1997 | Henderson et al. | 455/5.1 |
| 5,604,923 | 2/1997 | Wilkus | 455/67.7 |
| 5,619,196 | 4/1997 | Escobosa | 341/22 |
| 5,629,733 | 5/1997 | Youman et al. | 348/7 |
| 5,650,831 | 7/1997 | Farwell | 348/734 |
| 5,657,005 | 8/1997 | Seebeck et al. | 340/825.72 |
| 5,659,653 | 8/1997 | Diehl et al. | 386/46 |
| 5,663,757 | 9/1997 | Morales | 348/13 |
| 5,689,353 | 11/1997 | Darbee et al. | 359/148 |
| 5,710,605 | 1/1998 | Nelson | 348/906 |
| 5,734,838 | 3/1998 | Robinson et al. | 395/214 |
| 5,761,601 | 6/1998 | Nemirofsky et al. | 455/3.1 |
| 5,768,680 | 6/1998 | Thomas | 455/2 |
| 5,781,894 | 7/1998 | Petrecca et al. | 705/14 |
| 5,794,210 | 8/1998 | Goldhaber et al. | 705/14 |
| 5,822,123 | 10/1998 | Davis et al. | 348/906 |
| 5,828,945 | 10/1998 | Klosterman | 455/4.2 |
| 5,850,249 | 12/1998 | Massetti et al. | 348/1 |
| 5,855,008 | 12/1998 | Goldhaber et al. | 705/14 |
| 5,883,680 | 3/1999 | Nykerk | 348/734 |
| 5,886,691 | 3/1999 | Furuya et al. | 345/327 |
| 5,907,322 | 5/1999 | Kelly et al. | 345/327 |
| 5,923,016 | 7/1999 | Fredregill et al. | 235/380 |
| 5,940,073 | 8/1999 | Klosterman et al. | 345/327 |

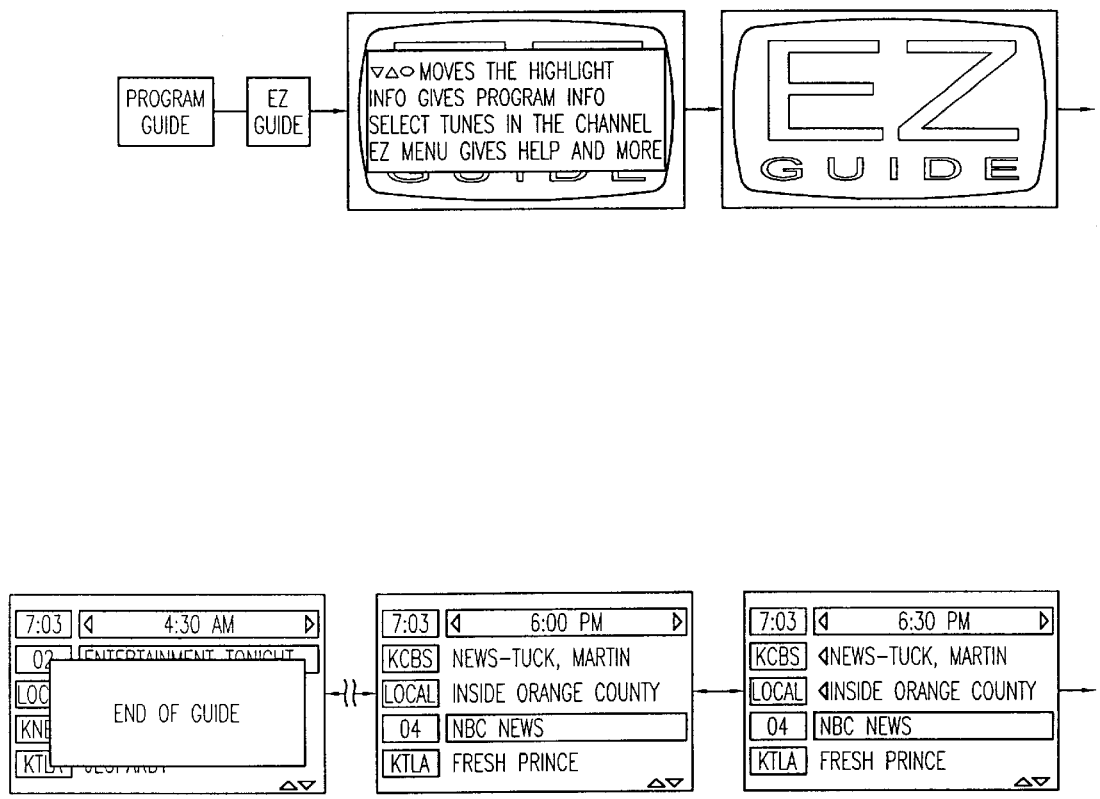
FIG. 5A
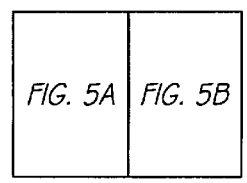

FIG. 24  FIG. 25  FIG. 26
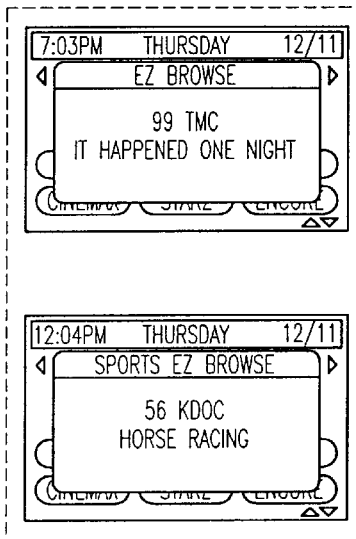
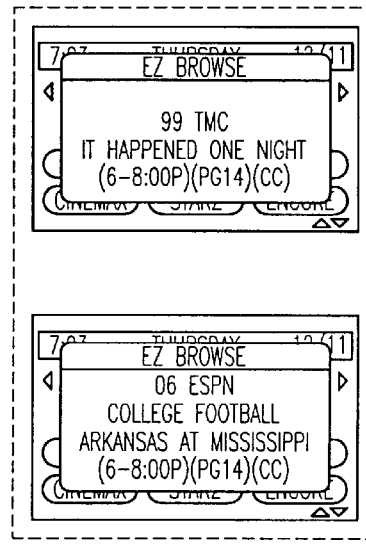
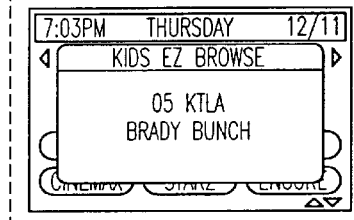

PROGRAM GUIDE ON A REMOTE CONTROL DISPLAY

CROSS REFERENCE TO RELATED APPLICATIONS

This application is a continuation-in-part of U.S. Ser. No. 08/999,716 filed Oct. 6, 1997 which is a continuation of U.S. Ser. No. 08/823,507 filed Mar. 24, 1997, now abandoned, and is a continuation-in-part of U.S. Ser. No. 09/010,093 filed Jan. 21, 1998. The disclosures of each of the aforementioned applications are incorporated herein by reference.

BACKGROUND OF THE INVENTION

1. Field of the Invention

The present invention relates generally to program guides and remote control systems for use in operating home entertainment systems and, more particularly, to a remote control unit having a visual display for depicting a program guide, advertising and/or other content. The present invention also is directed to systems and methods for providing graphic program scheduling and/or advertising information on a remote control display and to systems and methods for monitoring and analyzing user viewing habits and, thereafter, tailoring programming and/or advertising content to the interests of a particular viewer or device user.

2. Description of Related Art

Electronic Program Guides (EPGs) or Interactive Program Guides (IPGs) are applications which normally run on a screen of a television set or on a set-top box, with the program guide information appearing on the screen of the television. The problem with this approach is that the guide data must either replace or overlay the program that the user is watching, thus interfering with normal program viewing. This is especially a problem when a group of people is watching the television set and only one of them (usually the one with the remote control) wants to access the program guide.

Heretofore, various systems and devices for displaying a program guide on a television screen have been proposed. Examples of some of these program guide systems and related systems are disclosed in the following U.S. patents:

| U.S. Pat. No. | Patentee |
| --- | --- |
| 5,151,789 | Young |
| 5,220,420 | Hoarty et al. |
| 5,353,121 | Young et al. |
| 5,410,326 | Goldstein |
| 5,479,266 | Young et al. |
| 5,479,268 | Young et al. |
| 5,502,504 | Marshall et al. |
| 5,515,106 | Chaney et al. |
| 5,517,254 | Monta et al. |
| 5,523,796 | Marshall et al. |
| 5,524,141 | Braun et al. |
| 5,524,195 | Clanton, III et al. |
| 5,528,304 | Cherrick et al. |
| 5,532,754 | Young et al. |
| 5,537,107 | Funado |
| 5,550,576 | Klosterman |
| 5,557,338 | Maze et al. |
| 5,559,548 | Davis et al. |
| 5,568,272 | Levine |
| 5,576,755 | Davis et al. |
| 5,579,055 | Hamilton et al. |
| 5,585,866 | Miller et al. |
| 5,585,838 | Lawler, et al. |

-continued

| U.S. Pat. No. | Patentee |
| --- | --- |
| 5,589,892 | Knee et al. |
| 5,592,551 | Lett et al. |
| 5,596,373 | White et al. |
| 5,600,573 | Bendricks, et al. |
| 5,629,733 | Youman, et al. |
| 5,710,601 | Marshall, et al. |

Also, heretofore, two U.S. Pat. Nos. 5,282,028 and 5,406,558, have proposed the display of a music program information on an alphanumeric character display of a remote control for a digital music tuner. These patents state that the remote control could also receive video program information from a television set-top converter box. However, in all instances, the program data is limited to information concerning a particular song or video title that is being or may be broadcast, and there is no suggestion that the program data could or should include graphic program scheduling or advertising data. A typical program message includes, for example, information concerning the composer, track title, the artist and the album associated with the track title.

Thus, prior to the subject invention, it is believed that those skilled in the art failed to fully appreciate the usefulness of a remote control device. Specifically, those skilled in the art have failed to appreciate that a graphic display of a remote control device may be utilized to deliver both program scheduling and advertising data to a user without causing an interruption in any programming that currently is being viewed by the user.

Those skilled in the art have also failed to appreciate that, by providing intelligence within a remote control device, and by configuring the remote control device for two-way communication with the computer systems of content providers, it is possible to acquire and analyze substantial data regarding the program viewing habits of a user. After such data acquisition and analysis, it also is possible to provide the user with programming and/or advertising content that is tailored to the user's interests or demographic profile.

SUMMARY OF THE INVENTION

In one particularly innovative aspect, the present invention is directed to a remote control unit having a graphic display for depicting program scheduling and/or advertising information without causing an interruption in content that is being depicted on an associated television monitor.

In another innovative aspect, the present invention is directed to a remote control unit that is provided with a bidirectional communication capability and with intelligence for monitoring program selection data entered into the unit by a user.

In still another innovative aspect, the present invention is directed to a remote control unit having the ability to control a selection of both television and internet content for depiction on an associated monitor or other display.

A remote control or other remote device in accordance with a preferred form of the present invention has a visual display and is capable of receiving information wirelessly (via IR or RF). Such a remote control also preferably includes a processing unit and programming for selecting subsets of stored content data to be depicted on the display. Where stored content data, such as scheduling information, is to be filtered or parsed based upon a time indication, the remote control device also preferably includes a real-time clock for generating signals indicative of a current time.

A remote control system in accordance with the present invention also may include circuitry for receiving information for updating remote control codes as is taught in Darbee et al., U.S. Pat. No. 4,959,810, and the system may utilize a tap antenna unit for transmitting information locally, from a television set, as is disclosed in copending application Ser. No. 09/010,093 filed Jan. 21, 1998. Both of these disclosures are incorporated herein by reference.

Those skilled in the art will appreciate that numerous advantages may be achieved through the use of a remote control device in accordance with the present invention. For example, one principal advantage achieved through the use of a remote control in accordance with the present invention is that a program schedule, advertisement or other display depicted on the remote control does not interfere with normal program viewing on the television. Another principal advantage achieved through the use of a remote control in accordance with the present invention is that, in contrast to a typical television display, the display on the remote control can always be on, meaning that the remote control can act as a coffee-table billboard, touting pay-per-view events, products, services, coupon offers or any other advertising offers that traditionally appear in a printed program guide. A two-way remote control with a visual display for displaying an advertisement is disclosed in copending application Ser. No. 08/999,716, which is assigned to the assignee hereof and was filed on Oct. 6, 1997. The disclosure of application Ser. No. 08/999,716 is incorporated herein by reference.

Another advantage that may be achieved through the use of a remote control system in accordance with the present invention is that advertising and programming data may be selectively downloaded to and stored within the remote control depending, for example, upon an identification of the remote control unit itself, an identification of the user of the remote control or based upon some assessment of the viewing habits or preferences of the user.

Those skilled in the art will appreciate that this is, indeed, a significant advantage, because the amount of memory in a remote control usually must be minimized due to cost constraints, and because the wireless IR or RF link, which sends program guide information to the remote control, generally will have a finite bandwidth. In such embodiments, one or more unique serial numbers and/or addresses may be stored in memory in the remote control and may be used to uniquely identify an individual remote control unit or the user of such a unit. In addition, the serial number or address data may be used to filter and/or parse data transmitted by an associated set-top box (not shown) or RF Tap, as described in co-pending application Ser. No. 08/999,716, which has been incorporated herein by reference. This makes it possible to send specific program guide, advertising or other information to individual users or groups of users having remote control units linked to a given host system.

Thus, it will be appreciated that, in accordance with one aspect of the present invention, it may be an object for the remote control to store only a subset of available program guide and/or advertising information. The subset can be limited, for example, to specific channels, specific areas of user interest, specific genres of programming, or specific times. As explained above, in embodiments where timing information may be used to parse data for storage or retrieval within a remote control in accordance with the present invention, the remote control will generally be provided with a real-time clock, and signals generated by the real-time clock will be used in determining what data will be stored within the remote and/or what information will be depicted on the display of the remote control.

Further, where techniques or methods are employed for identifying which of several possible users may be using a remote control device in accordance with the present invention at any given time, the means for performing such an identification may take the form of a fingerprint recognition device or other physical data capture device that is built into the remote control. Alternatively, programming may be utilized to prompt a user to input personal identification information into the remote control device using, for example, a keypad provided on the face of the remote control. In such embodiments, user profile data may be entered into the device and thereafter linked to a hot-key to eliminate a need for re-entering data as the remote control device is passed from one user to the next, and back again.

Those skilled in the art also will appreciate that, while cable, satellite, or broadcast television signals generally will provide the source for transporting information to the remote control (using, for example, receiving circuitry in the set-top box or the television itself, along with an IR or RF wireless link to the remote control), those broadcast signals need not provide in all instances the signal source for the remote control. For example, in some embodiments of the present invention, traditional broadcast sources such as cable, satellite and network broadcast channels may be bypassed and alternative data links to the remote control may be provided. Such links may include, for example, paging networks, FM SCA data links, modem links and/or other data links, including wireless and non-wireless links to the Internet.

In still another innovative aspect, the present invention may provide for the use of compressed data transmissions to deliver programming guide, advertising and/or other data to a remote control device. Thus, it will be appreciated that in a system in accordance with the present invention it is possible to achieve substantial savings in the bandwidth that is required to establish and maintain a communication link between a data source and the remote control unit.

It will also be appreciated that, by allowing a remote control in accordance with the present invention to receive executable code as well as static information, the remote control can display animated graphics, run interactive sessions with a user, and/or upgrade its own software to enhance its usefulness.

In yet another innovative aspect, a remote control in accordance with the present invention may be configured either as a dedicated unit capable of controlling only one host device, or as a universal remote control capable of controlling multiple devices. Such devices may include traditional home entertainment system components, such as television sets, tape decks, CD players, laser disc players and stereo tuners, and/or alternative content sources such as personal computers, web computers or web browser applications.

In view of the foregoing, it is an object of the present invention to provide an improved remote control device for use within home entertainment systems.

It is another object of the present invention to provide a remote control device having a display for depicting graphic program guide, advertising and/or other information.

Other objects and features of the present invention will become apparent from consideration of the following description taken in conjunction with the accompanying drawings.

BRIEF DESCRIPTION OF THE DRAWINGS

FIGS. 3A–3D comprise a more detailed electrical schematic circuit diagram of the electrical circuitry shown in FIG. 2.

FIG. 12 also shows a protocol for launching the EZ Guide program and activating a program information portion of the program by depressing the EZ Guide key and subsequently the EZ Info key.

FIG. 24 shows two displays of program information, one being for an exemplary pay television event.

FIG. 25 shows four displays of EZ Browse pop-ups that are sorted based on a guide format sort, e.g. Sports or Movies.

FIG. 26 shows two displays of EZ Browse screens in which additional information is presented.

FIG. 27 also shows "splashes" when the EZ Info key is depressed and a proprietary menu is highlighted.

DESCRIPTION OF THE PREFERRED EMBODIMENT(S)

1. Remote Control Unit Implementation

Figure 1:
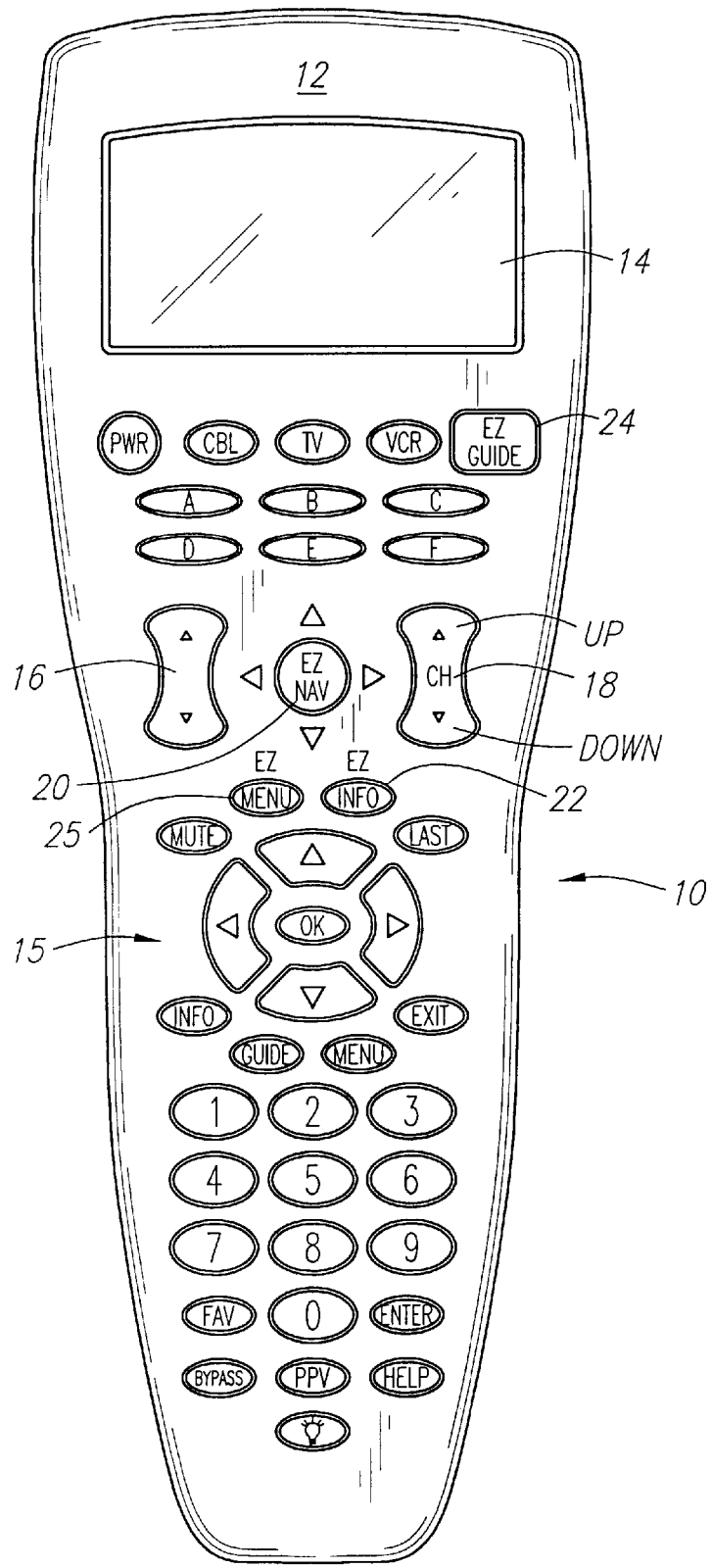
FIG. 1 is a top plan view of a remote control in accordance with one form of the present invention and having a visual display for displaying a program guide, an advertisement or other information.

Turning now to the drawings, a remote control device 10 in accordance with one preferred form of the present invention is illustrated in FIG. 1. As shown, the remote control device 10 may include on a top panel 12 thereof a LCD visual display 14 and a keyboard 15 including a volume Up and Down key 16, a channel Up and Down key 18, an EZ navigator, EZ NAV, key 20, an EZ information, EZ Info, key 22, an EZ Guide key 24 and an EZ Menu key 25, among others. The EZ navigator, EZ NAV, key 20 preferably comprises a five-way navigation key or "joy stick" such that in addition to providing up, down, right and left key strokes, it may also be depressed.

In a preferred form, a second set of hot-keys for activating and controlling set-top or cable box features is also provided. Such keys may include, for example, an information, Info, key for accessing content broadcast by a local cable company, a Menu key for accessing a television or cable host menu, and a Guide key for accessing programming guide information broadcast by a cable company or other host network. By providing these keys in addition to those described above, maximum compatibility is achieved with conventional cable systems and program guide service providers.

Figure 2:
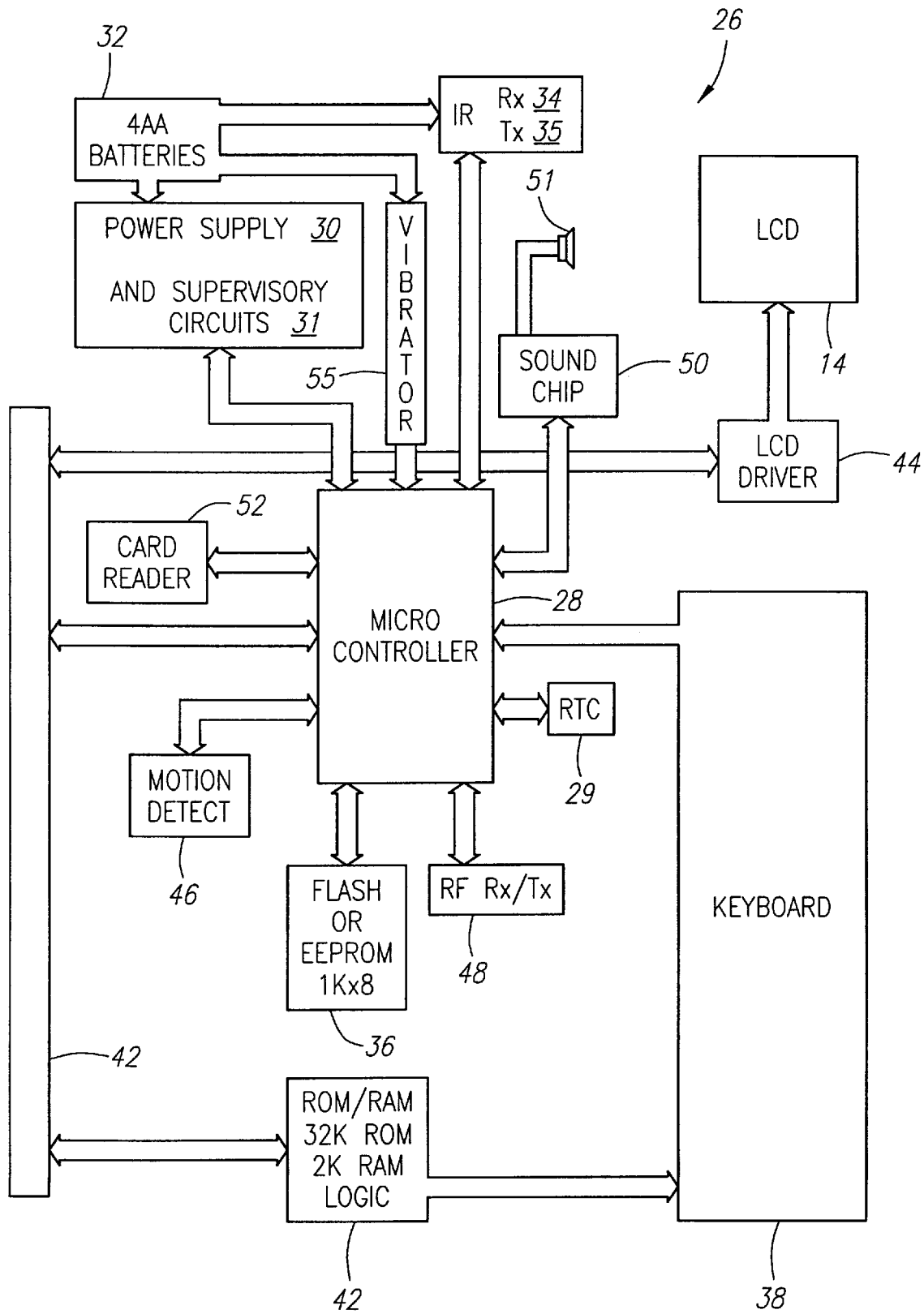
FIG. 2 is a block schematic diagram of the electrical circuitry for the remote control shown in FIG. 1.
Figure 3A:
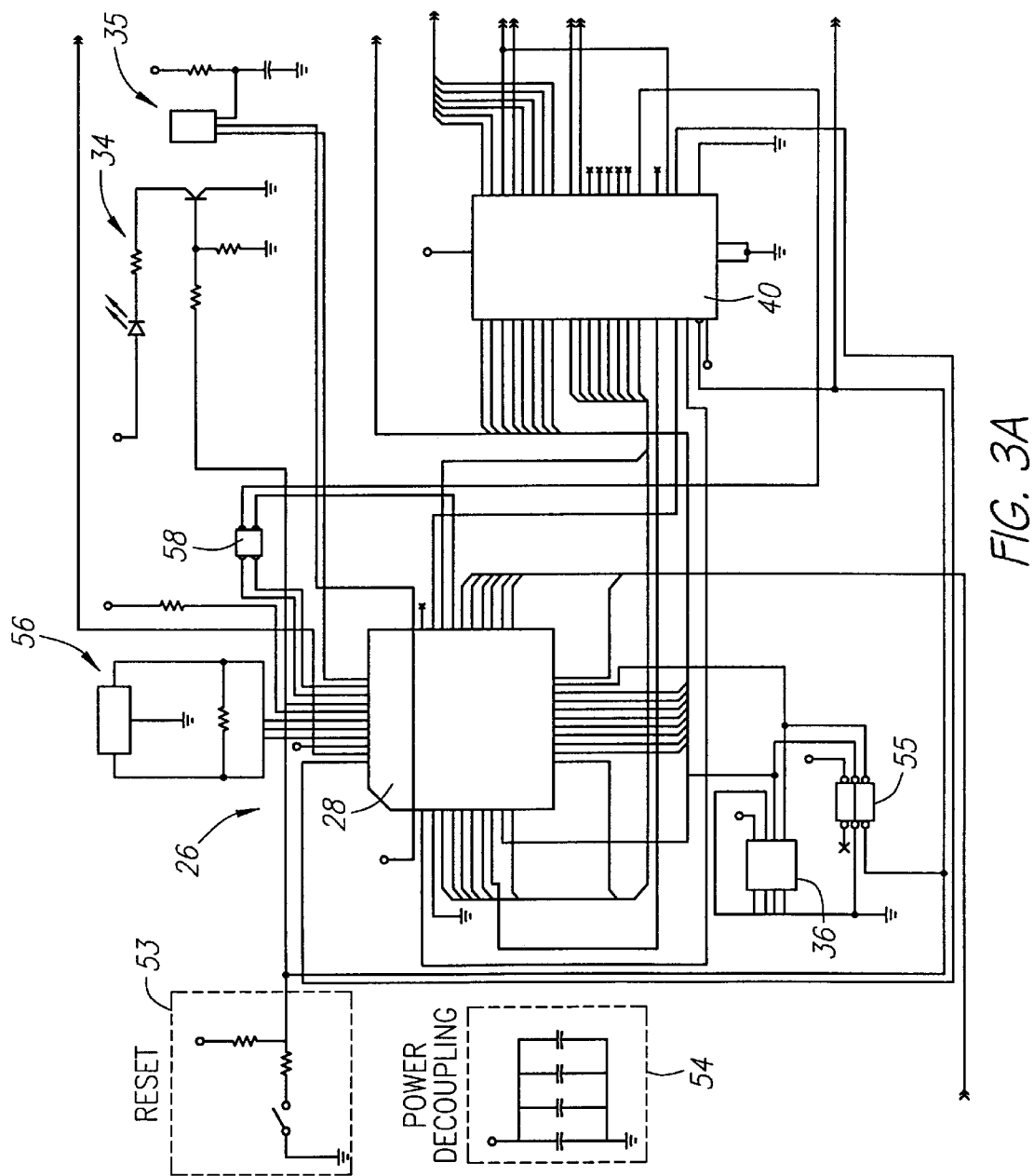
Figure 3B:
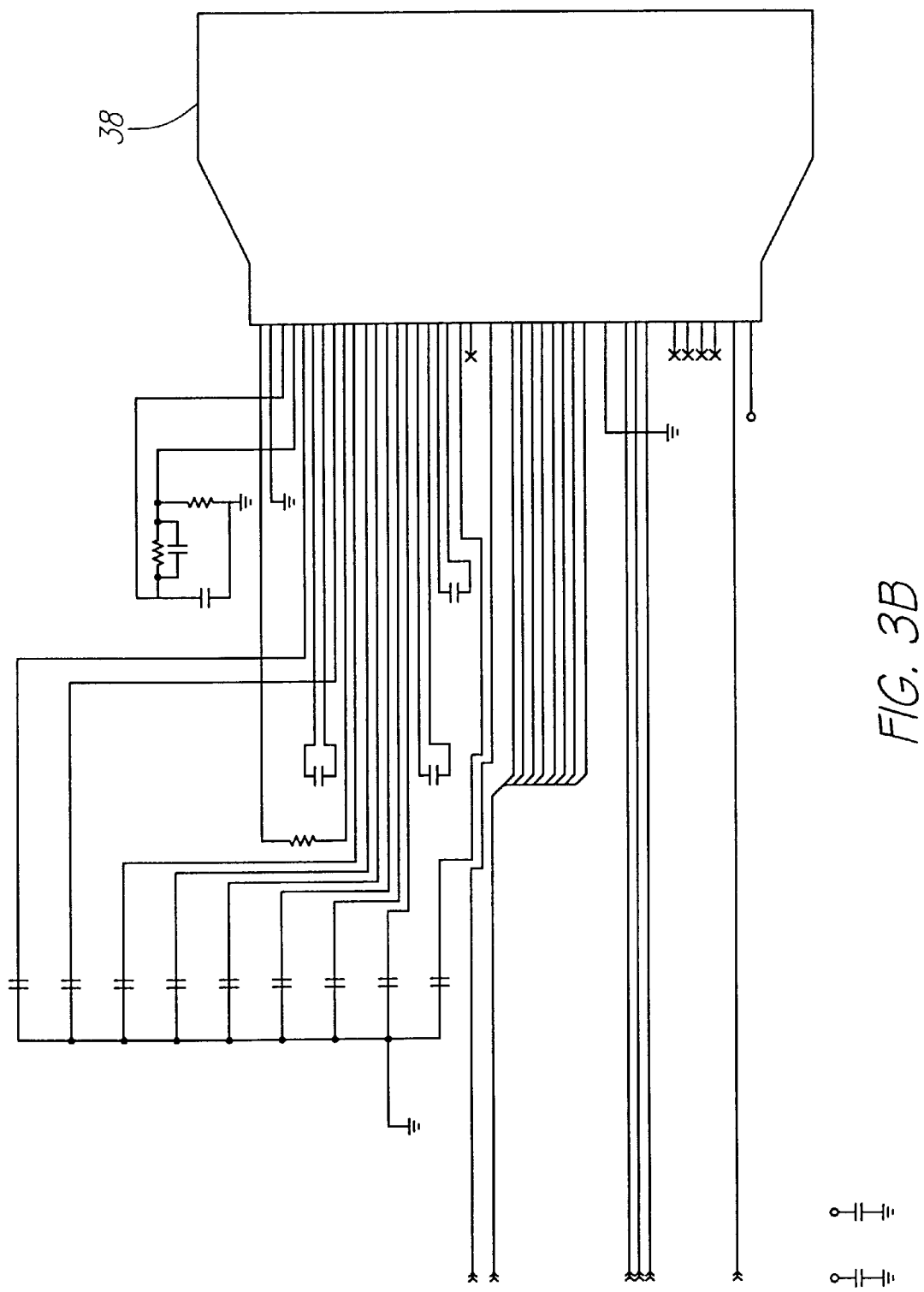
Figure 4:
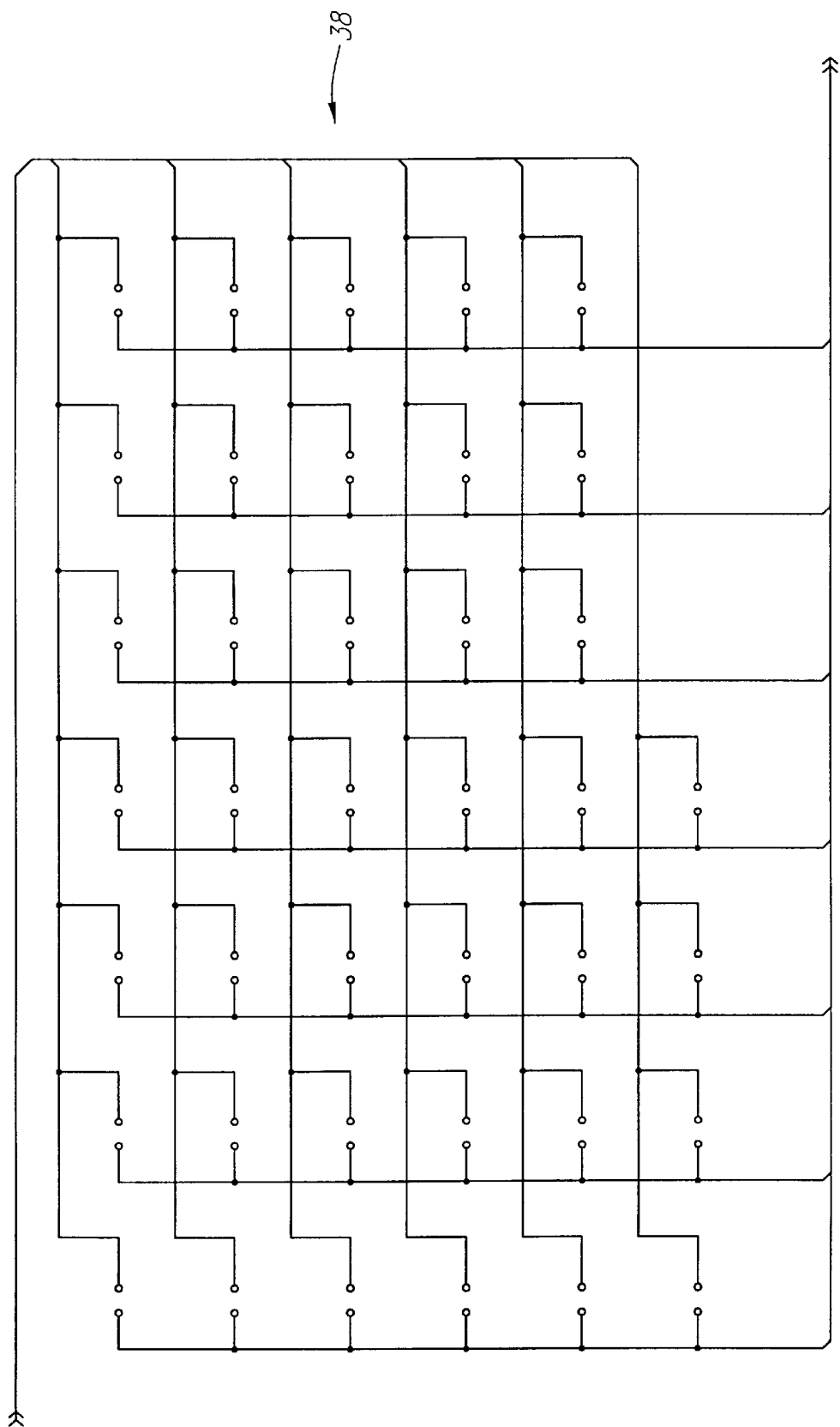
FIG. 4 is a block schematic diagram of the keyboard circuit employed in the remote control shown in FIG. 1.

Referring now also to FIG. 2, the remote control unit 10 includes electrical circuitry 26 preferably comprising a microcontroller or microprocessor 28 supplied by a power supply 30 and supervisory circuits 31 including batteries 32, IR transmitting and receiving circuits 34 and 35, a LCD display 14 and LCD driver 44, key board circuitry 38 together with associated memory and logic 40, and a data bus 42 that provides a communication link between the microprocessor 28, keyboard circuitry 38 and LCD driver 44. Memory in the form of a FLASH RAM or EEPROM 36 also preferably is coupled to the microprocessor 28. If desired, a radio frequency receiver or transceiver circuit 48 may also be coupled to the microprocessor 28. It will be appreciated that the radio frequency transceiver circuitry 48 may be provided in addition to or in the place of the IR transmitter and receiver circuits 34 and 35. As explained above, a real-time clock 29 is also coupled to the microprocessor and provides the microprocessor with signals indicative of a current time. However, it will be appreciated that the real-time clock 29 also may comprise a portion of the microprocessor 28, or may be implemented in software.

In additional embodiments, a motion detect circuit 46, smart card or credit card reader 52, vibrator circuit 55, sound chip 50 and/or speaker circuit 51 may also be connected to the microprocessor 28.

While it is believed that the implementation and interconnections of the aforementioned circuits should be readily understandable to those skilled in the art, a more detailed diagram of the circuitry comprising the remote control unit 10 is provided in FIGS. 3A–3D. As shown in FIGS. 3A–3D, the supervisory circuits 31 include a reset circuit 53 and a power de-coupling circuit 54. The electrical circuitry 26 further includes an oscillator 56 coupled to the microprocessor 28 and an RS 232 serial port 58. The microprocessor 28 preferably comprises a model no. MC68HC05COFB microprocessor manufactured and distributed by Motorola, Inc.

A software protocol, application, or program that is executed by the microprocessor 28 controls the operation of a remote control unit 10 in accordance with the present invention. This programming enables the remote control unit 10 to perform conventional operations including, for example, ON, OFF, Volume Up or Down and Channel Up or Down functions, as well as, numerous other functions including, for example, program guide display, advertising display, internet content display and/or system monitoring functions that are described in more detail below.

The operation of an exemplary software protocol, or program, that may be stored in the ROM/RAM 40 or the FLASH RAM or EEPROM 36 of the remote control unit 10 for displaying a program guide, advertising or other content on the visual display 14 is illustrated diagrammatically in FIGS. 5–34. Those skilled in the art will appreciate that FIGS. 5–34 comprise a series of displays or screens that may appear on the visual display 14 of the remote control unit 100 as certain keys on the keyboard 15 are depressed or otherwise manipulated. It is believed that any programming required to implement the described features of the present invention would be readily accomplished by one skilled in the art. Thus, no source or object code is provided herewith.

In a presently preferred embodiment, the program guide is operated on a small 5-line by 20-character LCD screen or display 14 that is provided on the remote control unit 10. Preferably, the program guide is a basic, 24-hour, electronic listing for all major cable television and broadcast stations within a geographic area. However, those skilled in the art will appreciate that the program guide may be modified, if desired, to cover a longer or shorter duration, to include a broader listing, such as a national listing, and to include additional content, for example, one or more listings of internet web sites or URL designations. In such embodiments, the EZ NAV key 20 may be utilized to navigate and effect data entry from an alphanumeric keyboard (not shown) depicted on the display 14. Moreover, it will be appreciated that the EZ NAV key 20 may be utilized to enter internet addresses or URL designations and relevant descriptive information into the remote control unit 10, to the extent that such information is not transported to the remote control unit 10 from other sources. It will also be appreciated that such information may be incorporated into a program or content guide stored within the memory 40 of the remote control unit 10.

In embodiments where the remote control unit 10 receives and stores data comprising a program guide or content scheduling guide, the 24-hour period covered by the program guide preferably will rollover at 4:00 a.m. each day. Thus, data for the next day's guide preferably will be broadcast to the local units within a geographic area starting at approximately 4:00 a.m. local time.

Further, in the presently preferred embodiment, there is minimal buffering of the received data. When a new day's information is loaded into a remote control unit 10 in accordance with the present invention, the new day's information will be written by block to a buffer (not shown) and checked for completeness before overwriting of an old information block is performed. When the downloading and/or data overwriting operation is in progress, operation of the program guide will be suspended, and the user will not be able to use the guide. However, once the downloading and/or overwriting process is completed operation of the programming guide will be reinitiated enabling the user to again use that feature of the remote control unit 10. Those skilled in the art will appreciate that the overwriting periods should be relatively short and, if possible, "invisible" to the user. During this period, a "Guide information Incomplete!" message will be displayed if the user selects the guide. Finally, the blocks of program guide information preferably are transmitted in such a manner to allow complete processing of a single block of data within the remote control unit 10 before the start of transmission for the next block. As it is believed that RF and IR interfaces between electronic components such as personal computers and peripheral devices are well known in the art, the communication link(s) between a remote control unit 10 and, for example, an associated set-top box (not shown) or television will not be described in detail herein. Reference is instead made to co-pending application Ser. Nos. 08/999/716 and 09/010, 093, and U.S. Pat. No. 4,959,810, both of which have been incorporated herein by reference.

As is explained in detail in co-pending application Ser. No. 09/010/093, a program guide and advertising data signal may be combined with television channel signals on a coaxial cable to form a composite signal. Further, this may be done in such a manner that the program guide and advertising data occupies a frequency band between a pair of frequency bands assigned to two of the television channels. The composite signal may then be broadcast by a content provider, such as a cable company or satellite network, and delivered to a set-top box (not shown) or television tuner provided, for example, in a viewer's home.

In accordance with a presently preferred form of the present invention, a tap antenna unit may be coupled to the set-top box or television tuner, or to a cable feeding the set-top box or television tuner. The tap antenna also may split off a portion of the composite signal and demodulate the split off portion of that signal to recover the program and advertising data signal. The recovered program and advertising data signal may then be broadcast within a local environment using, for example, an RF transmitter circuit within the tap antenna unit. The locally broadcast program and advertising data signal may then be received, for example, by the RF transceiver circuit 48 of the remote control unit 10.

In alternative embodiments, it may be desirable to transmit blocks of program guide data to the remote control unit 10 over additional intervals or, possibly, at random times. In one such embodiment, new program guide data might be provided to the remote control unit 10 using an IR link each time that a user activates the remote control unit 10 or uses the remote control unit 10 to select a channel for viewing.

The database for the guide which is broadcast to a given region preferably will cover all of the television stations within the areas that may be received by a viewer either over-the-air or on cable television systems in that region, if the schedules for those stations or networks are carried in a master database assembled daily, for example, by Television Data of New York, the Tribune Company of Chicago, the Prevue Channel of Tulsa, or other program guide data aggregators. Of course, the database also may comprise a national listing such as might be provided by USA Today. Stations preferably are identified by their call-sign (call letters), network logo or affiliation and by channel numbers. Basic channel mapping is pre-assigned. However, channel mapping may be modified locally by the user through the use of a set-up screen.

While the program guide is preferably configured to handle up to 100 channels of programming information or content, databases of 50 to 60 channels are most common.

Figure 5B:
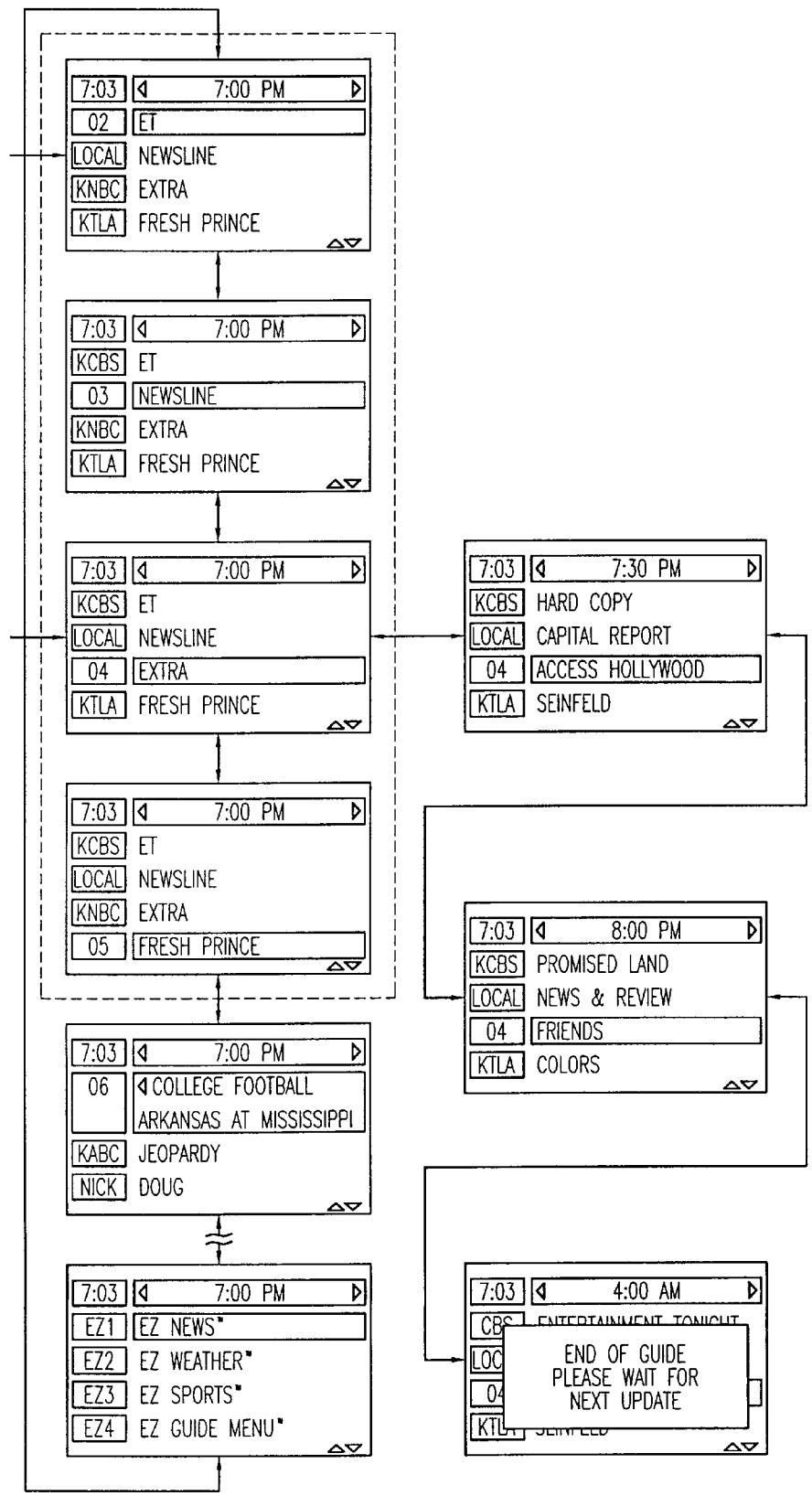
FIG. 5 is a flow chart in the form of display screens or displays on the visual display shown in FIG. 1 of a guide launch and grid navigation protocol followed by the remote control when selected keys on a keyboard of the remote control are pressed.

Preferably, the display "window" views a virtual program information grid with time as the lateral axis and channel, program or content source as the vertical axis. Each screen preferably displays information for one half-hour of the 24-hour period. The display moves laterally to the right for later times, or to the left for previous times (FIG. 5). The "window" of the display moves up or down to display the program information that may be associated with different stations, networks and/or content providers for a selected half-hour interval (FIG. 5).

Preferably, there are two major modes for operating the guide, (i) Quick View mode, and (ii) Detail View mode. The Quick View mode displays 4 channels per screen of call-sign/Network information followed by program title only (e.g. FIGS. 5 and 7–9). The Detail View mode offers various levels of detail about a program such as title, episode, actors, guests, rating, etc (FIG. 10). A user may navigate either mode independently, or may switch back and forth as may be desired.

Figure 13:
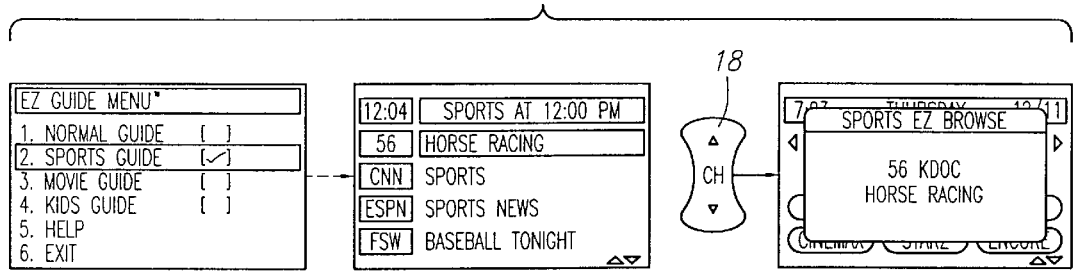
FIGS. 13–16 show a series of displays that may be obtained when cycling through an EZ Guide Menu including a Sports Guide, a Movie Guide, a Kids Guide, and an EZ Browse Guide, and when a CH up or down key is activated.
Figure 14:
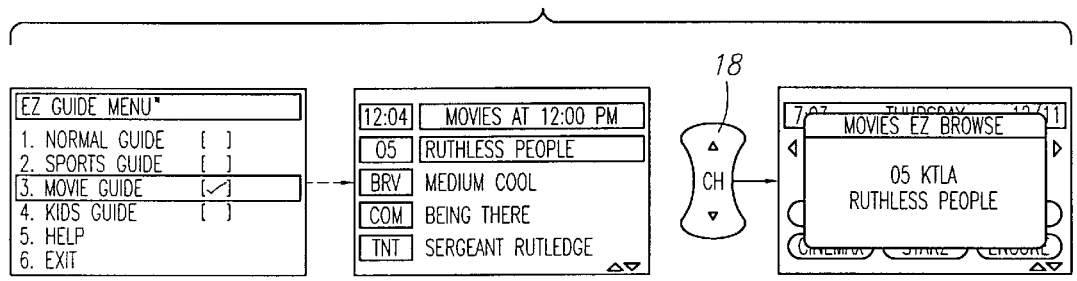
Figure 15:
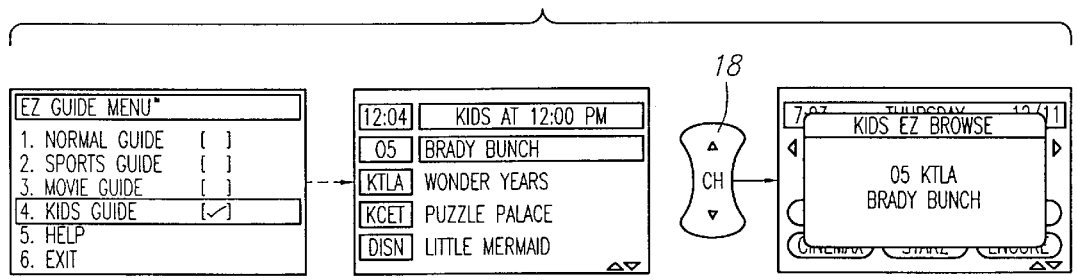

Besides Normal Guide, there preferably are at least two additional guide categories, Sports and Movies (FIGS. 13–14). If the Sports category is selected, the guide will display only information designated as sports related. Selecting Movies will similarly limit the guide to the display of films shown during that day. Another guide categories may include, for example, Family Guide or Kids Guide (FIG. 15).

Figure 12:
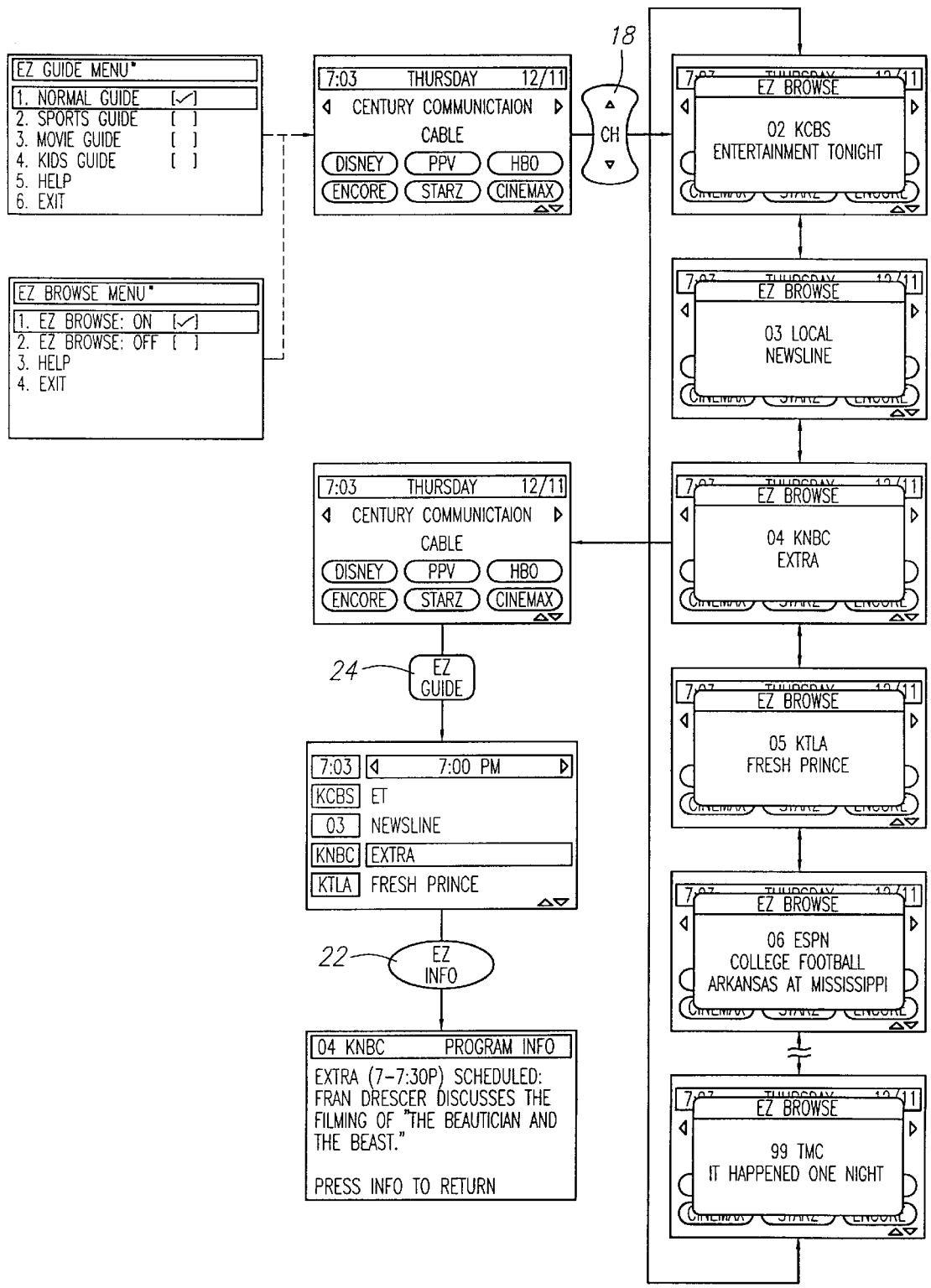
FIG. 12 shows a series of displays that may appear on the visual display when a user cycles from either a Normal Guide portion or an EZ Browse portion of a program guide program to a channel selection portion of the program by depressing a channel, CH, up or down key while in the EZ Browse mode.

The guide preferably has an EZ Browse mode that will cause the remote control 10 to display the detail information about the current program on the channel presently tuned by the last operation of the remote control 10. In the EZ Browse mode, and preferably in all other modes, when the CHANNEL Up or CHANNEL Down keys are pressed, the remote will not output a channel up or down command, but rather will substitute a "direct tune" command to the next higher or next lower numeric channel (FIG. 12). This process may be referred to as "forced tuning," and preferably involves the transmission of channel selection macro data (i.e., specific channel selection data) from the remote control unit 10 to an associated television tuner.

Those skilled in the art will appreciate that because channel selection using a remote control in accordance with the present invention is performed in this manner, it is possible for the software application running on the remote control unit 10 to obtain and cause to be stored in memory data indicative of the viewing habits of one or more users, or groups of users, of the remote control unit 10. The data stored may include for example, a date stamp, time stamp and/or channel identification data. In embodiments where the remote control unit 10 is used in conjunction with a personal computer or web computer, the data stored may also include an internet address or URL designation stamp. It is also possible for the software application running on the remote control unit 10 to cause, for example, stored program or content selection history data and, if desired, serial number, address or user identification data, to be transmitted to an associated set-top converter box and on to a given content provider or host system. Alternatively, such an information transfer might be effected using an IR or RF link to a personal computer or using a more conventional modem port. Finally, once data indicative of the particular viewing habits, content selection characteristics or interests of a particular remote control user or group of users is transmitted to the content provider or host system, the content provider or host system may tailor additional programming, advertising or other content to be provided to the remote control unit 10. Again, the serial number, address and/or user information maintained within the memory of the remote control unit 10 may be used to filter and/or parse data, including programming information, advertising or other content, that is broadcast by the host system to a group of remote control units. These functions and capabilities are preferably provided by a remote control unit 10 and associated broadcast system in accordance with the present invention.

For many users, leaving the remote control unit 10 in the EZ Browse mode may be very desirable, since tuning the set with the remote control 10 will automatically give an instant indication of the program on the visual display 14.

Finally, the programming of a remote control unit 10 in accordance with the present invention preferably provides the capability to vary the size of the font(s) used for the program guide, as this will enable users, for example, with impaired vision to more easily use the program guide and users with better vision to obtain information more quickly using the program guide. Similarly, provision is made for the utilization of different character sets and languages on the display 14 of the remote control unit 10.

2. Program Guide Operation

The operation and navigation of a program guide in accordance with a preferred form of the present invention is described below. As explained above, a plurality of Guide Control keys, including an EZ Guide key 24, EZ navigation, EZ NAV, key 20, EZ information, EZ Info key 22, EZ Menu key 25 and channel, CH, key 18 are provided on the face of the remote control unit 10. In addition, arrows indicative of Up, Down, Left and Right commands preferably are arranged in diamond shaped cluster around the EZ NAV key 20. Thus, using the EZ NAV key 20 it is possible to move to the right, left, up and down within a depicted program guide. It will also be appreciated that, by depressing the EZ NAV key, it is possible to effect channel selections. For example, if a program depicted on the display 14 of the remote control unit 10 is highlighted, one need only depress the EZ NAV key 20 to select that channel for viewing on an associated television set (not shown). Further, as explained above, when the EZ NAV key 20 is depressed, channel selection macro data is provided to an associated set-top box (not shown) or television tuner circuit (not shown).

In a presently preferred embodiment, information is depicted on the display 14 of the remote control unit 10 with a current time, guide time and four channels per screen (one program per line) for each half-hour of the program guide as shown below. A typical screen, Screen n, shown below, indicates that the current time is 5:30, that a 7:30 PM program guide segment has been selected and that four programs in the 7:30 PM guide segment may be selected from that screen.

Screen n:

```
        5:30  ◀ 7:30 PM ▶
        KCBS Promised Land
        KESQ Home Improvement
        KNBC Frasier
        HBO "Mission Impossible"   ▲▼
```

If, for example, the program guide is scrolled down four listing, the following exemplary screen, screen n+1, may be depicted:

Screen n+1

```
        5:30  ◀ 7:30 PM ▶
        DISN "An American Ta
        SHOW "Magic in Water
        A&E Biography
        CNN Moneyline  ▲▼
```

Upon pressing the EZ Info key 22, information is displayed one program per screen for each half-hour on a multi-screen carousel of screens. Taking screen n, illustrated above, as an example, if KESQ HOME IMPROVEMENT is highlighted in that screen and the EZ Info key 22 is depressed, the following program data screen, program n, may be displayed on the remote control.

Program n, carousel screen 1 of 1:

```
            07 KESQ 7:30 PM
            Home Improvement
            Al reveals a secret.
            S (CC): 30   ▲▼
```

If a different program and channel were highlighted, the following program information might be depicted on the display 14 of the remote control unit 10.

Program n+1, carousel screen 1 of 1:

```
            15 ESPN 7:30 PM
            Boxing: Kennedy
            McKinney vs. Hector
            Sanchez (Same day
            tape) 2:00    ▲▼
```

Additional screens of programming information might be presented as follows:
Program n+2 carousel screen 1 of 2:

```
            25 HB0 7:30 PM
            FILM***"The Brink's
            Job"(1978 Comedy)
            Peter Falk. Bumblers
            try to break into    ▲▼
```

Program n+2, carousel screen 2 of 2:

```
            25 HBO 7:30 PM
            the impregnable
            Brink's vault. PG 13
            S (CC) 1:30    ▲▼
```

Preferably, orientation pop-up screens or "splashes" are used whenever a screen is changed in either of the guide modes. The purpose of the Orientation Pop-Up (OPU) is to orient the user with respect to the user's virtual Time/Channel position in the overall program information grid and to show the user the current day and time as a viewing reference. A typical OPU is shown below:

Orientation Pop-Up screen n:

```
                  WED ----- 10:00 PM
                  CH 15 USA
                  Wed May6    12:14p
```

In one presently preferred embodiment, the program guide may contain single-line and multi-page information relevant to each program in a twenty-four hour period. The program guide also may contain a call sign (call letters or network) to channel table, favorite channel table and call-sign display order/priority table, each of which may be filled in by the user to reflect his or her particular channel mapping and program preferences.

While being navigated, the program guide may be temporarily suspended while the visual display is used for a pop-up advertisement. Ads may comprise a single screen or a carousel of screens and, if desired, may include executable code to enable a user to access additional information, purchase a product, request coupons etc.

In a detail view, part or all of a program carousel may comprise an advertisement. Thus, in many embodiments, a user may be provided with advertising data while simultaneously receiving program guide information. It will be appreciated that Ad screens may be text-based or bit-mapped.

3. Program Guide Navigation

The following discussion will provide additional information regarding navigation of a program guide in accordance with a preferred form of the present invention.

Presently, it is preferred that a program guide in accordance with the present invention be operated in one of two modes, Quick View and Detailed View.

Each of these modes of operation is described below.

Turning first to the Quick View mode, from some operational mode outside of the Program Guide mode, the user presses the EZ Guide key 24. In response, the remote control unit 10 may display an optional pop-up ad (advertisement) for a period of time, followed by a Guide Logo splash with a Quick Help pop-up displayed while the EZ Guide key 24 is depressed. When the EZ Guide key 24 is released, the splash is displayed without the Quick Help pop-up and will time out quickly, such that a Guide screen may be displayed.

At any point, if the cursor is on a program line and the user presses the EZ NAV key 20, the remote control 10 preferably will tune the television to the appropriate channel (i) if the program is currently showing, and (ii) if a call-sign to channel table is available. Otherwise a pop-up screen reminds the user that the program is not showing yet, or that no channel table exists. If the cursor is on the menu line in the top position at the top of the channel list, a carousel menu will appear with additional Program Guide configuration choices.

At any point, if the cursor is on a program line and the user presses the EZ Info key 22, the remote control unit 10 preferably will switch to Detail View and display the first of a multi-screen carousel of information relevant to that program. If the cursor is on the menu line in the bottom position at the top of the channel list, a menu will appear with Program Guide configuration choices. This can also be accomplished by going to the EZ Menu or EZ Guide menu.

Similarly, if the user presses the down arrow (i.e., moves the EZ NAV key 20 in the direction of the down arrow depicted on the face of the remote control), the cursor will preferably shift down one line to the next station/network. If the cursor is on the bottom line, the display preferably shifts down to the next screen, displaying the four programs of the next four networks in the same time-slot, with the cursor placed on the bottom line of that screen. This is shown in FIG. 5 of the drawings. In similar fashion, if the user presses the up arrow (i.e., moves the EZ NAV key 20 in the direction of the up arrow depicted on the face of the remote control unit 10), the cursor preferably moves up to the station/network on the line immediately above. If the cursor was on the top line, the display preferably shifts up to a previous screen, displaying the four programs of the previous four networks in the same time-slot, with the cursor now placed on the top line. Those skilled in the art will recognize that this is but one example of how a program guide in accordance with the present invention may be navigated and, thus, that numerous other methods are available and would be viewed as equivalent to the method disclosed herein. For example, it would be deemed to be equivalent to display only a single new program listing when the cursor moves from the top or bottom line of a screen in a direction requiring the display of additional programming.

Also, it is presently preferred that the program or channel listings comprise a continuous loop such that if the cursor is moved up from the lowest numbered channel in the program guide, the next channel or program presented will correspond to the highest numbered channel in the program guide and so on.

When screen changes occur, the cursor placement described above facilitates a quick perusal of all the screens in the Quick View guide by allowing single, consecutive presses of either the Up or Down arrow button to change full screens when progressing in a uni-directional manner.

If the user presses the right arrow (i.e., moves the EZ NAV key 20 toward the right arrow depicted on the face of the remote control unit 10), the display preferably shifts "right" in the grid to one-half-hour later but does not change the set of networks being displayed; the left arrow shifts the display to one-half-hour earlier, again with the same networks being displayed.

Turning now to the Detail View mode, if the cursor is on a program line and the user presses the EZ Info key 22, the display will change to the Detail View format. Each additional press of the EZ Info key 22 causes the next page in the program description carousel to be displayed on the visual display 14.

Preferably, there is no cursor in the Detail View mode. Thus, if the user presses the Down Arrow, the visual display 14 shows the first page of the carousel of the next network down at the same time slot in the grid. Pressing the Up Arrow, the display shows the first page of the carousel of the previous network at the same time slot in the grid. This is illustrated in FIG. 10.

If the user presses the Right Arrow, the visual display 14 shows the first page of the carousel of the program on the same network one half-hour later; the Left Arrow shows the first page of the carousel of the program on the same network one half-hour earlier.

For Left or Right Arrow action, in the case of programs that span two or more half-hour time slots, the user has the option of viewing the same program carousel (at the next half-hour time slot) or jumping to the starting time slot of the next program on the same network.

4. Movie Guide

From the Guide carousel, there preferably are two Movie selection options, (i) All Movies, and (ii) Movies by Time (FIGS. 10 or 15).

The All Movies selection from the carousel has the appearance of the Quick View guide (i.e., four lines of movies per screen) and shows the station/network and title of all the movies either starting at the present half-hour, in-progress, or starting at some time in the future for the present 24 hour period. The movies are arranged in chronological order in a single "vertical" list. A "break" will be clearly indicated in this single list between the movie currently showing and the ones to be shown at the future times in order to clearly delineate to the user those movie choices directly selectable from the list by use of the EZ NAV key 20 (i.e., ones that are "now showing").

Movies in progress preferably will have a single or double left arrow preceding the title depending upon whether they started earlier by one half-hour, or one hour or more respectively.

When in the All Movies mode, the Up and Down arrow buttons will operate the cursor in a similar manner to that used in the Quick View guide described above.

Highlighting a movie selection, either current or future, and pressing the EZ info key 22 will bring up the Detail View information about that movie. The OPU screen will be available to show the user the time slot information for the selected movie. Pressing either the Left or right arrow keys will return the screen to the All Movies screen from which the original detail selection was made by use of the EZ info key 22.

The Movies by Time selection from the carousel will immediately provide a pop-up screen allowing the user to enter the time of day for which he wishes to see the available movie list. The pop-up screen may instruct the user to use a 1 or a 2 to differentiate AM and PM (i.e., a key entry of "1,2,3,0,1" would be 12:30 a.m. and 7,3,0,2, would be 7:30 p.m.). Alternatively, the pop-up screen can be a time matrix screen with the cursor at the present hour, or some other time, and with the cursor able to be navigated to the desired hour and selected using the EZ NAV key 20. In still other embodiments, the available movie list may simply be presented at a current or other designated time and may be navigated using the EZ NAV key 20, as has been described above with reference to the EZ Guide. It will be noted however that, in either the EZ Guide or Movies by Time mode, the EZ NAV key 20 may be utilized to direct the user to listings for a current time, to listings for some time before or after that period, or to listings for prime time. Such a capability may be implemented, for example, by tracking the time that the EZ NAV key 20 is depressed in a given direction, for example, up, down, right or left, and upon detecting that the EZ NAV key 20 has been depressed for the requisite time period, and moving within the EZ Guide or Movie Guide to the designated time or prime time.

Upon entry of the time, the guide operation will be similar to the All Movies form described above with the exception that the list will begin with the hour entered on the pop-up screen.

From the Guide carousel, there preferably also are two Sports selection options, (i) All Sports, and (ii) Sports by Time.

The Sports guide operates exactly the same as the Movie Guide described above, except that it displays sports related programs (as designated in the guide's data file) instead of programs designated as movies.

Since there are many "sports related" programs in addition to actual games or contests, a third carousel category could be added to Sports, called Games. The object of this category is to show the user only those programs that are actually games and contests as opposed to sports news, talk shows and other programs not showing actual games in the major sports.

5. Presentation Order for Guide Channels

The order of presentation of the guide channels preferably will be in the same order as they are received and stored in the database for that 24-hour period, unless the user has entered (i) a channel map for the Guide and/or (ii) a favorite channel selection table. If the channel map and the favorite channel table are resident, the guide will automatically display the favorite channels (in the order of the table) as the first station/network entries in the Guide presentation.

6. Program Guide Remote Control Database Structures

The following is a description of program guide database structures that may be used in a remote control unit 10 in accordance with a preferred form of the present invention.

Program Guide Constants:

GRID_COLS 48; # number of half-hour time-slots in 24 hours

Program Guide State Variables:

```
{   unsigned char    ;    #Quick or Detailed View
    unsigned char    ;    #Display Guide Grid Row
    unsigned char    ;    #Display Guide Grid Column
    unsigned char    ;    #Real-Time Column - This Presumes that
    the remote has an RTC.    }
```

Data Structures:

Link Table Structure:

```
{   unsigned char              rows; #Number of Rows (Networks)
    in Guide
    unsigned int [rows][GRID_COLS]; #Array of offsets to Program
    Records relative to first    }
```

If there are 50 networks, there will be 50*48*2=4800 bytes in the Link Table.

Link Table Structure may be transmitted in sections allowing progressive updates.

A program that spans multiple columns will have multiple entries in the Link Table; each entry will point to the same Program Record Structure.

Program Record Structure:
Links:
Links point to the Start of Record (SOR) of another Program Record.
Each link is related to an arrow key.
Start Time Slot:
0 to 47 representing Midnight to 11:30 p.m.
1 byte
Start Offset:
minutes from Start Time Slot start time
1 signed byte
Run Time (In half-hour units)
1 byte
Program Category (this section needs work!)
1 byte MSO=0: Category 0–127
  MSO=1: Expansion bit, Reserved
Quick View String
  20 chars
Detail View Carousel:
  Carousel Size
  1 byte—Number of screens in this carousel (0 indicates no screens)
  If Carousel Size>0, repeat for 1 to Carousel Size
  Carousel Screen:
    1 byte enumerated:
    00—Variable length, null-terminated ASCII char string follows:
      variable bytes—ASCII char string
      (approx. 80 bytes for full scrn)
      1 byte—\x00 (null terminator)
    01—Variable length, null-terminated HTML
      variable bytes—HTML coded ASCII
      char string
      1 byte—\x00 (null terminator)
    02—120×32 pixel monochrome Bit Map follows.
      480 bytes—byte packed bit-fields
    03-FF—Reserved for future expansion.
Notes:
  Program Records are entered into the table consecutively and without gaps. The program Record corresponding to the first time-slot of the first network will be the first record written.
  Software enables the remote to update/modify/complete specific fields prior to display. Two such fields are the channel number of a program and the time remaining indicator for a program.

7. Program Guide Transmission Format

The following is a description of the formatting that may be utilized in transmitting program guide, advertising or other content data to a remote control unit 10 in accordance with a preferred form of the present invention.

In a presently preferred form, data transmitted to the remote control unit 10 is formatted such that a program guide is transmitted to the remote control unit 10 one time-slot at a time. This format provides for a clean "time-block crossover" and facilitates database updating because the Program Guide record database can be updated "in-place". Only the time-slot just received needs to be changed in the database, all other time-slots are merely shifted up or down (and link table adjusted) to make room for the new information.

As for the records of Multi-time slot Programs, those records preferably are sent only once, but the Link Table entry for those programs in subsequent time-slot transmissions preferably will have a flag bit set that will cause the entry to be overwritten by the correct offset.

8. Geographic Structure of Guide Data

A master database of all programs delivered throughout the U.S. by stations/networks is gathered and maintained and updated daily, for example, by Television Data in New York, the Tribune Company of Chicago, and the Prevue Channel of Tulsa. There are two major segments of Television Data's maintained database, national network programming for both broadcast and cable networks, and local programming carried by the hundreds of television broadcast stations, both independent and network affiliated, located throughout the U.S. A comprehensive or all-inclusive data file covering both segments of television Data's database would, for now and due to cost constraints, be too large to download to individual remote controls on a daily basis. Therefore, geographic segmentation is preferably done to facilitate a manageable data file in the appropriate regions.

Preferably, the guide data of the present invention is broken down into two major categories, (i) data delivered by nation-wide satellite and/or pager feeds, and (ii) data delivered by individual cable systems.

There are approximately 40 national cable/broadcast networks whose programming is the same throughout the country. Some are time-shifted for the major time zones of the country, but the programming is otherwise constant. These networks preferably are carried in all of the data feeds. The programming aired by local stations or local cable channels preferably is added to the appropriate geographic data fields as may be required.

Data feeds for the program guide may be delivered electronically (typically via telephone lines) to the various distribution points such as individual or regional cable headends or paging network distribution hubs. Specific data feeds may be built by a central computer working with the nation-wide master database provided by television Data. Each night, data for the next day's programming preferably is processed and broken into the daily files required for each distribution hub.

Guide data files delivered to individual cable system headends preferably are built on a case-by-case basis as needed to support those systems that will deploy the remote controls units 10 with an integral guide in accordance with one or more forms of the present invention. The process involved preferably allows for securing of a listing of all channels carried by the system, culling of a master database to build the required file(s), and delivery of the file(s) to modem equipment at the systems headend.

Referring now in greater detail to FIGS. 5–34, the series of displays illustrated in FIG. 5 begins with a current screen which, in the illustrated embodiment, has the display "Program Guide."

When the EZ Guide key 24 is pressed, an EZ Guide direction screen pops up while the key is held down. Upon release of the key 24, the EZ Guide's splash screen preferably is displayed and will time-out after one second.

Figure 9:
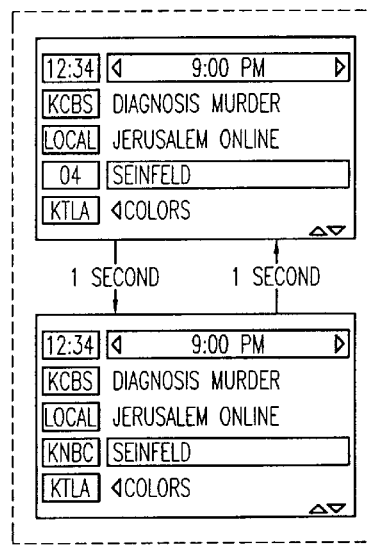
FIG. 9 provides an illustration of two screens that may be displayed in the display of the program guide shown in FIG. 1, when a program guide application running on the remote control cycles between channel number and channel call letters for one second intervals.
Figure 10A:
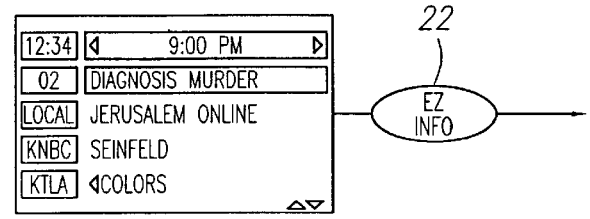
FIG. 10 is a flowchart, in the form of displays that may appear on the visual display of the remote control shown in FIG. 1, when a program information portion of a program guide is activated by pressing an EZ information, EZ Info, key on the remote control to cause program information to be displayed on the display of the remote control.
Figure 10A:
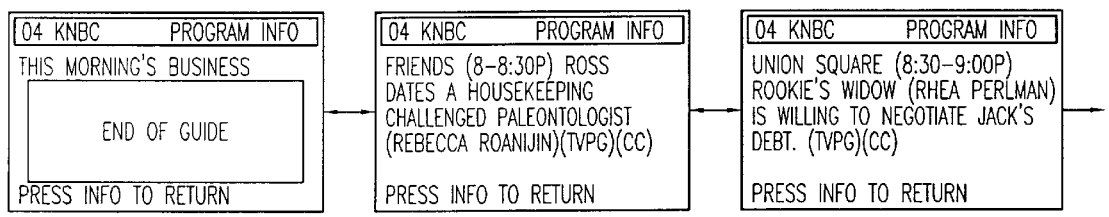
Figure 10A:
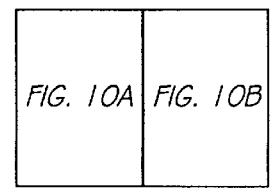
Figure 10B:
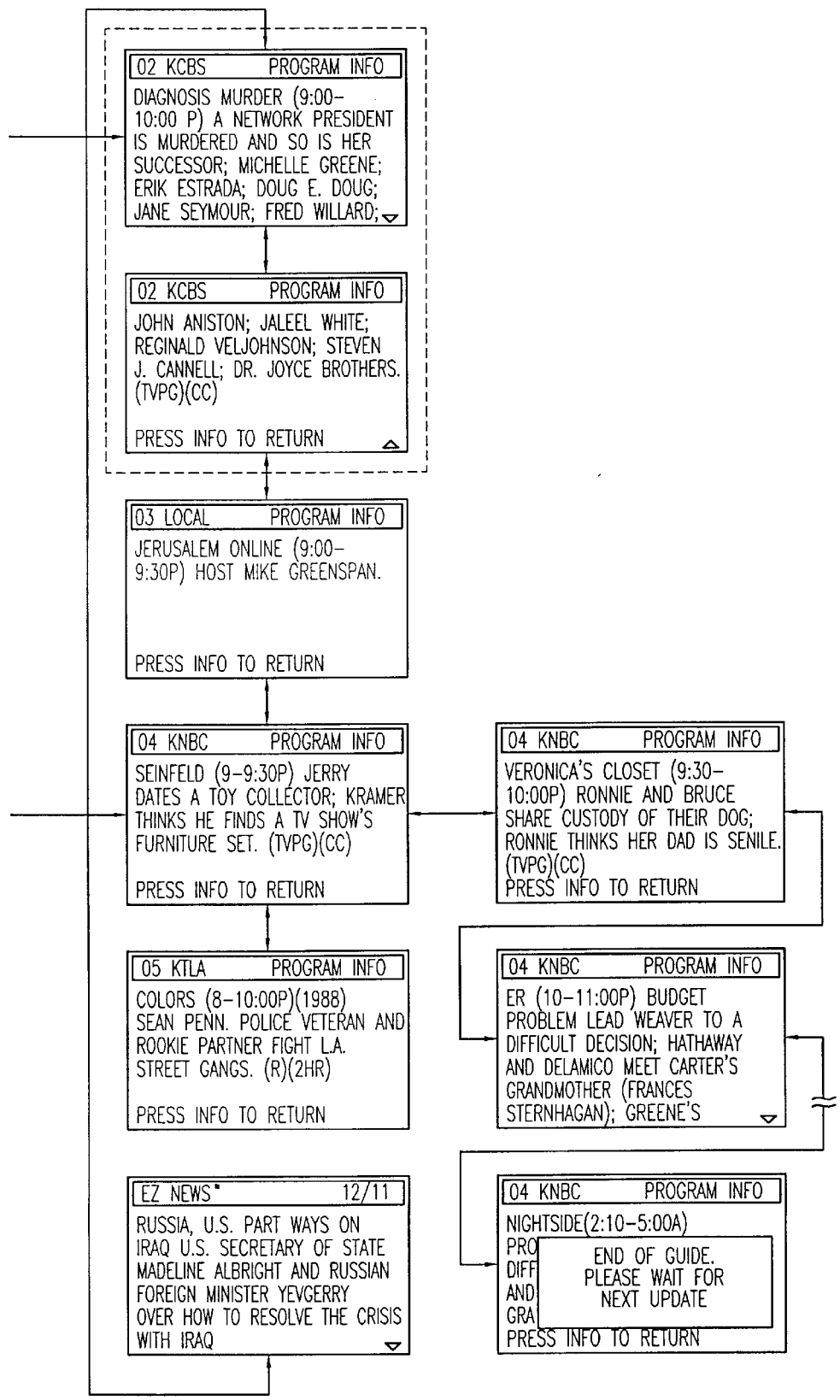

From there the program guide preferably launches into the current half-hour time block. However, the program guide may launch, if desired, into a time block that precedes or follows the current half-hour time block. At this time, the top program of the channel map is preferably highlighted. This screen may time-out, if desired, after one minute or longer and allow for the depiction of a current promotion or promo screen. The highlighted channel preferably will cycle between name and number for one second as shown in FIG. 9.

Navigation in the program guide is effected using up, down, left and right strokes of the EZ NAV key 20. The transitions between screens preferably are wipes in the corresponding directions as shown in FIG. 5. if the user holds the up or down key down consecutively for 5 channels, the guide preferably will start to page. This will allow users to go through long lists very fast by not making them scroll through 4 channels per screen. Preferably, only one channel will be highlighted per screen until the user changes the scroll. The four screens surrounded by the dashed line represent the opening screen with the user moving the highlight.

Figure 7:
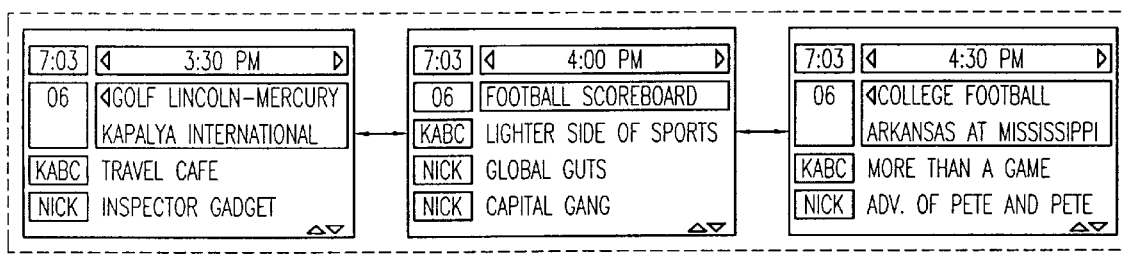
FIG. 7 shows three displays obtained upon scrolling of the visual display in successive half-hour increments for one channel.

To go backwards in time, one presses the left arrow and a new screen a half-hour earlier is displayed as the user scrolls left. The highlight scrolls with the same channel until the user scrolls up or down as shown in FIG. 7. Preferably, the number of screens is determined by the amount of past guide information still contained within the memory buffer until an "End of Guide" pop-up is displayed and no left direction arrow is displayed.

If the user holds the left or right key down consecutively for 5 half-hour screens, the guide preferably will jump to the current time or prime time. In addition, the program guide preferably will jump to whichever one is first and in the direction that the user is traveling.

In scrolling to the left, a new screen a half-hour earlier is displayed and again the highlight scrolls with the same channel until the user scrolls up or down. Similarly, in scrolling to the right, a new screen a half-hour later is displayed with the currently highlighted channel remaining in place.

Also, again, if the user holds the right key down consecutively for 5½ hour screens, the guide will jump to the current time or prime time.

The number of screens that may be displayed when scrolling in a given direction preferably is determined by the amount of future guide information contained within the memory buffer. As explained above, in some embodiments, the memory buffer will constantly be receiving guide updates and, therefore, the last screens will be moving continually into the future until an "End of Guide" pop-up is reached on the screen and the right direction arrow is not displayed.

Turning again to FIG. 5, beneath the four screens or displays surrounded by the dashed line, there is shown a new screen that is displayed after the user scrolls beyond the top or bottom of the current screen. Note that program titles can take up 1, 2, 3, or 4 lines.

The number of screens will be determined by the size of the channel map and the length of each program title. The channel map is predetermined for each system and can be changed by the program guide provider or the user.

Then, as shown, proprietary menus, channels or links (e.g. EZ News, EZ Weather, etc.), to information services and additional features can be provided by the program guide. Selection of the EZ Guide menu preferably provides the user with guide options and features.

In addition, if an EZ Browse function is enabled, use of the channel UP and Down keys, preferably will trigger the program guide to display channel information upon each key stroke. This feature is illustrated in FIGS. 12–15. As shown, for example, in FIG. 12, as the channel UP key is depressed sequential screens within the program guide corresponding to the selected half-hour period and including, for example, basic programming information are displayed.

Figure 6:
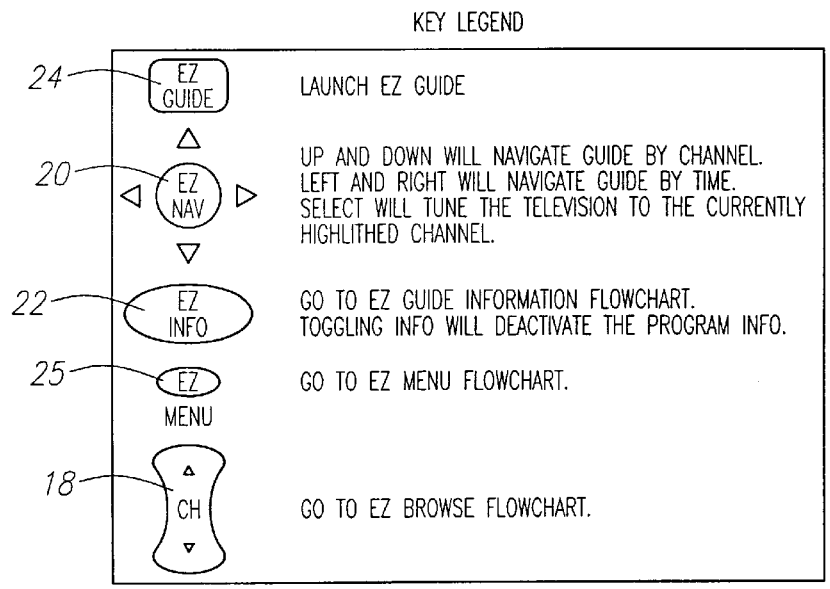
FIG. 6 is a key legend of significant keys that may be depressed on the keyboard to use the program guide displayed on the visual display.

Turning now also to FIG. 6, a key legend setting forth the function of 5 program guide keys, namely, EZ Guide key 24, EZ NAV key 20, EZ Info key 22, EZ Menu key 25 and channel, CH, up/down key 18, is provided. The use of these keys in navigating a program guide in accordance with the present invention is discussed below with reference to FIGS. 7–34.

Figure 8:
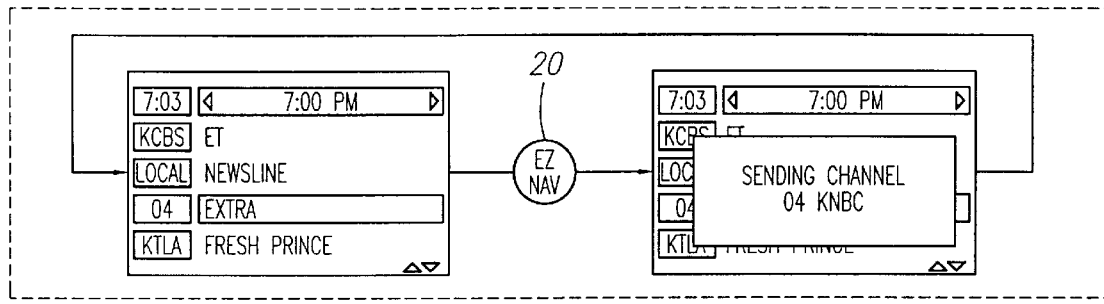
FIG. 8 illustrates a current display and a display that may appear on the visual display when a user presses an EZ navigation, EZ NAV, key of a remote control in accordance with a preferred form of the present invention.

FIG. 7 shows that, in accordance with a preferred form of the present invention, a highlighted channel will remain the same as the user scrolls left to right. The same would preferably apply when the user scrolls from right to left within the program guide. FIG. 8 shows the transition from a current screen to an "EZ Guide Tune Channel" pop-up when the EZ NAV key 20 is depressed and held down. As explained above, when the EZ NAV key 20 is depressed and held down, channel selection macro data corresponding to the currently highlighted channel will be transmitted to an associated set-top box or television tuner (not shown) by the remote control unit 10. During that process, a forced tuning indicator pop-up screen is depicted on the display 14 over the currently selected program guide screen.

FIG. 9 shows how a program guide in accordance with a preferred form of the present invention may provide for cycling between the display of a channel number and set of channel call letters for a highlighted or selected program.

FIG. 10 provides an illustration of how an EZ info key 22 may be used within a program guide in accordance with a preferred form of the present invention. As shown, the program guide shifts from a Quick View format to a Detail View format when the EZ Info key 22 is depressed. Preferably, the highlighted program information or Info screen is launched when the EZ Info key 22 is depressed, will time-out after one minute or longer, if desired, and will then launch a current promotional or promo screen. Navigation within the Detail View format is effected using the EZ NAV key 20. As is the case with the Quick View format, movement within the program guide may proceed in any of the up, down, left, or right directions, with the exception that movement in the left and right directions will generally be limited by the amount of programming information (24 hours nominally) that is stored within the remote control unit 10. The transitions between screens preferably are wipes in the directions of received keystrokes. The screens within the dashed line in FIG. 10 represent programming information relevant to a currently selected program. Note that multiple pages may be used when all of the relevant information cannot be displayed in one screen or display, and that the down arrow indicates that more information is available for a currently highlighted program. The end of information relevant to a current program preferably is represented by the upper arrow and a return note.

Navigating beyond the end of the previous program's information screen will display the next channel's program information. A single screen can represent a single info screen and no arrows are necessary. Again, one can scroll left or right until reaching an "End of Guide" pop-up. The number of screens is determined by the size of the channel map and the length of each program's info screens.

Again, the EZ Guide flow chart can cycle through a series of proprietary links or EZ channels for information, services, features and/or other content provided by a host system, e.g. EZ News, EZ Weather, etc.

Figure 11:
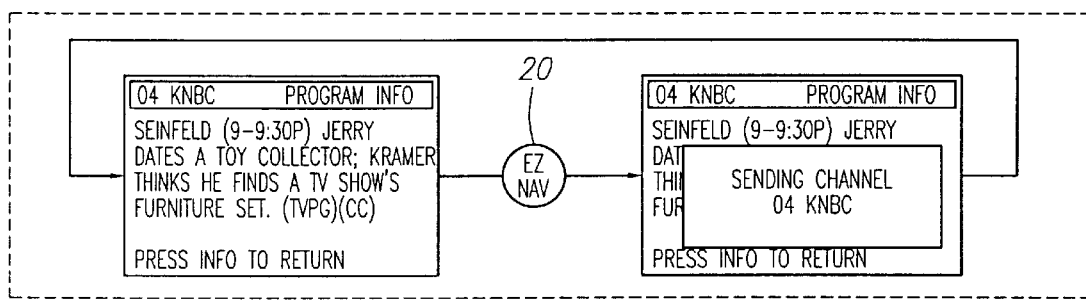
FIG. 11 illustrates a current display and a display that will appear on the visual display when a user depresses an EZ navigator, EZ NAV, key while the program guide application is running in the program information mode

FIG. 11 shows cycling from a current info screen when the EZ NAV key 20 is pressed and held down to display an "EZ Guide Tune Channel" pop-up.

FIG. 12 is a flow chart illustrating a series of screens that may be displayed as a user enters and maneuvers within an EZ Browse mode in accordance with a preferred form of the present invention. Entering the EZ Browse mode preferably is achieved by starting from a Normal Guide highlight of an EZ Guide Menu display or from the EZ Browse Menu with the EZ Browse ON selected. Then the channel up or down key is depressed to browse through the various channels. The remote control 10 will send a channel selection macro to tune the user's set-top box (not shown) or television (not shown) directly to the cable channel number. The EZ Browse pop-up will follow the channel map used for the EZ Guide. The EZ Browse pop-up is limited to basic information and the screen will time-out after 10 seconds and go back to the current remote screen. If the channel key 18 is held down, the pop-ups will change as fast as the macros can finish sending the channel numbers. The navigation of the EZ Browse is channel up or down only. As shown, after a ten-second time-out, the screen returns to a current place-holder screen. From there, one can press the EZ Guide key 24 to launch the EZ Guide and then press the EZ info key 22 to obtain more information.

FIGS. 13, 14 and 15 show the selection of a guide from the EZ Guide menu followed by pressing the channel up or down key 18.

Figure 16:
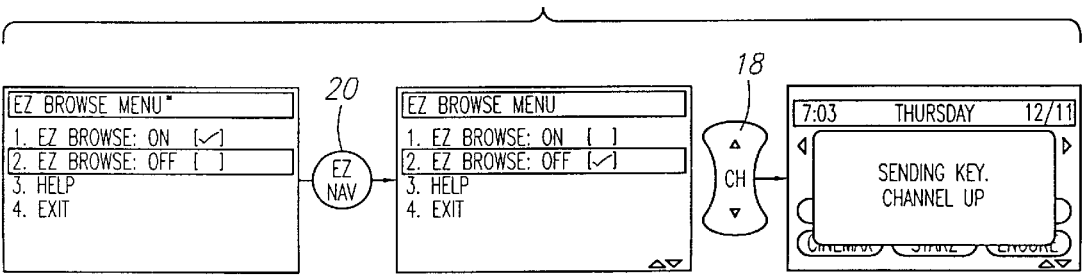

FIG. 16 shows how the EZ Browse application may be turned off by depressing the EZ NAV key 20 when, in the EZ Browse menu, the EZ Browse Off indicator is highlighted. Channel selection may then continue with normal channel up and channel down commands. However, in a preferred form, the remote control unit 10 will continue to effect channel selection by a forced tuning method as described above. Again, this enables a remote control unit 10 in accordance with the present invention to acquire and store channel selection history data for later use by the host system or some other entity.

Figure 17:
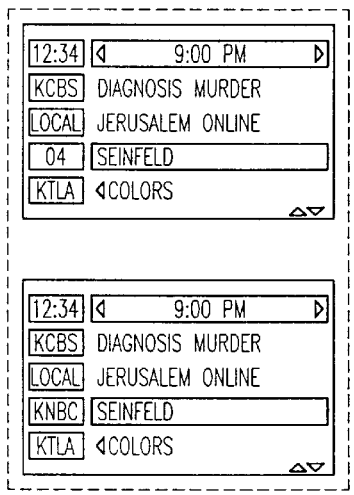
FIG. 17 shows two displays showing channel call letters with one display having a program and channel number highlighted and the other display having program and channel call letters highlighted.
Figure 18:
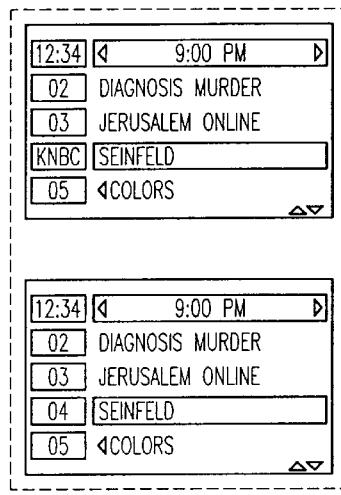
FIG. 18 shows two displays showing channel numbers with one display having program and channel number highlighted and the other display having program and channel call letters highlighted.
Figure 19:
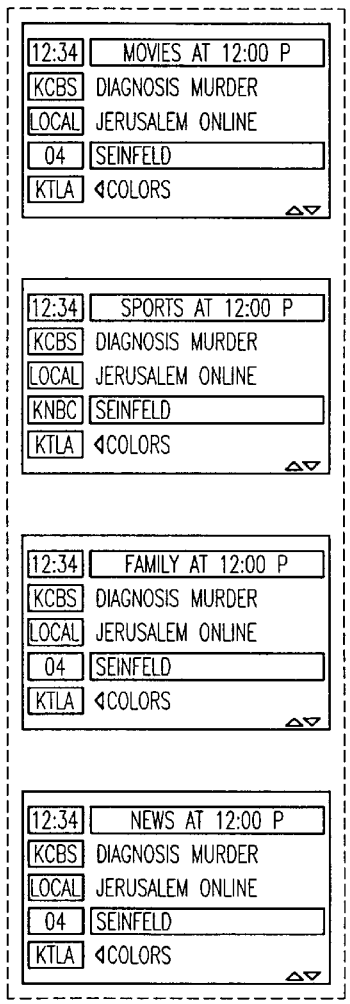
FIG. 19 shows four displays representing four guide formats, including Movies, Sports, Family, and News, that may be utilized on a remote control in accordance with the present invention.

FIGS. 17–26 show grid formats of the EZ Guide. For example, FIG. 17 shows a first guide format wherein channel names or call letters are predominantly provided, and FIG. 18 shows a second guide format wherein Channel Numbers are predominantly displayed. As explained above, in a preferred form, a highlighted channel will cycle between a channel number and channel call letter set display.

Figure 21:
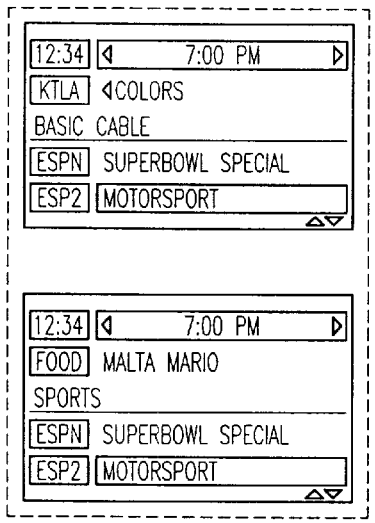
FIG. 21 shows two displays of alternate pre-sorted guide formats.
Figure 22:
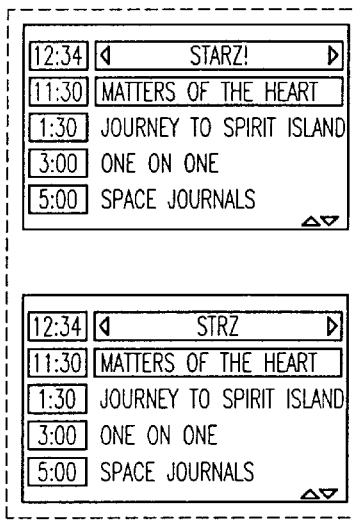
FIG. 22 shows two displays of alternate guide formats by channel.
Figure 23:
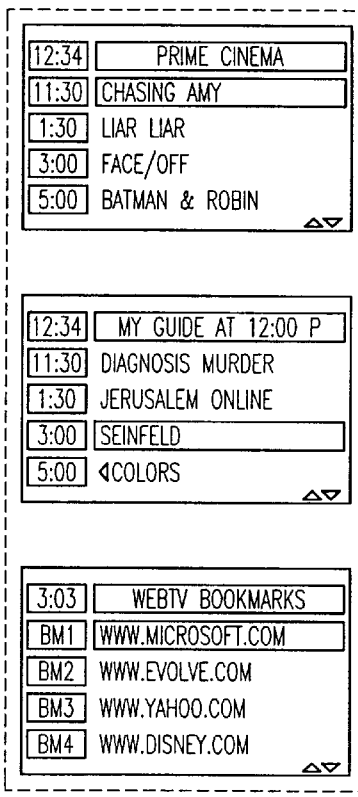
FIG. 23 shows three displays of specially sorted guide formats by channel names.
Figure 20:
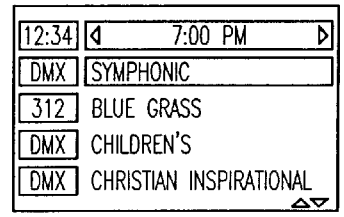
FIG. 20 shows a display of an exemplary audio guide format.

Turning now to FIGS. 19–23, FIG. 19 shows four sorted guide formats available through the EZ Guide Menu. FIG. 20 shows an Audio Guide format. FIG. 21 shows presorted alternate guide formats with cable television listings. FIG. 22 shows further alternate guide formats that can be associated with MSO soft keys, that may force tune an associated set-top box (not shown) or television (not shown) directly to advertised channels and, in embodiments where a personal computer, web computer or web browser is linked to the remote control unit 10, to advertised Internet sites or Web pages. FIG. 23 shows additional specially sorted guide formats.

FIG. 24 shows a current program info screen and an interactive (pay television) program info screen.

Turning now to FIGS. 25 and 26, FIG. 25 shows four EZ Browse pop-up screens that sort based on a guide sort, and FIG. 26 shows two EZ Browse screens with additional information.

Figure 27A:
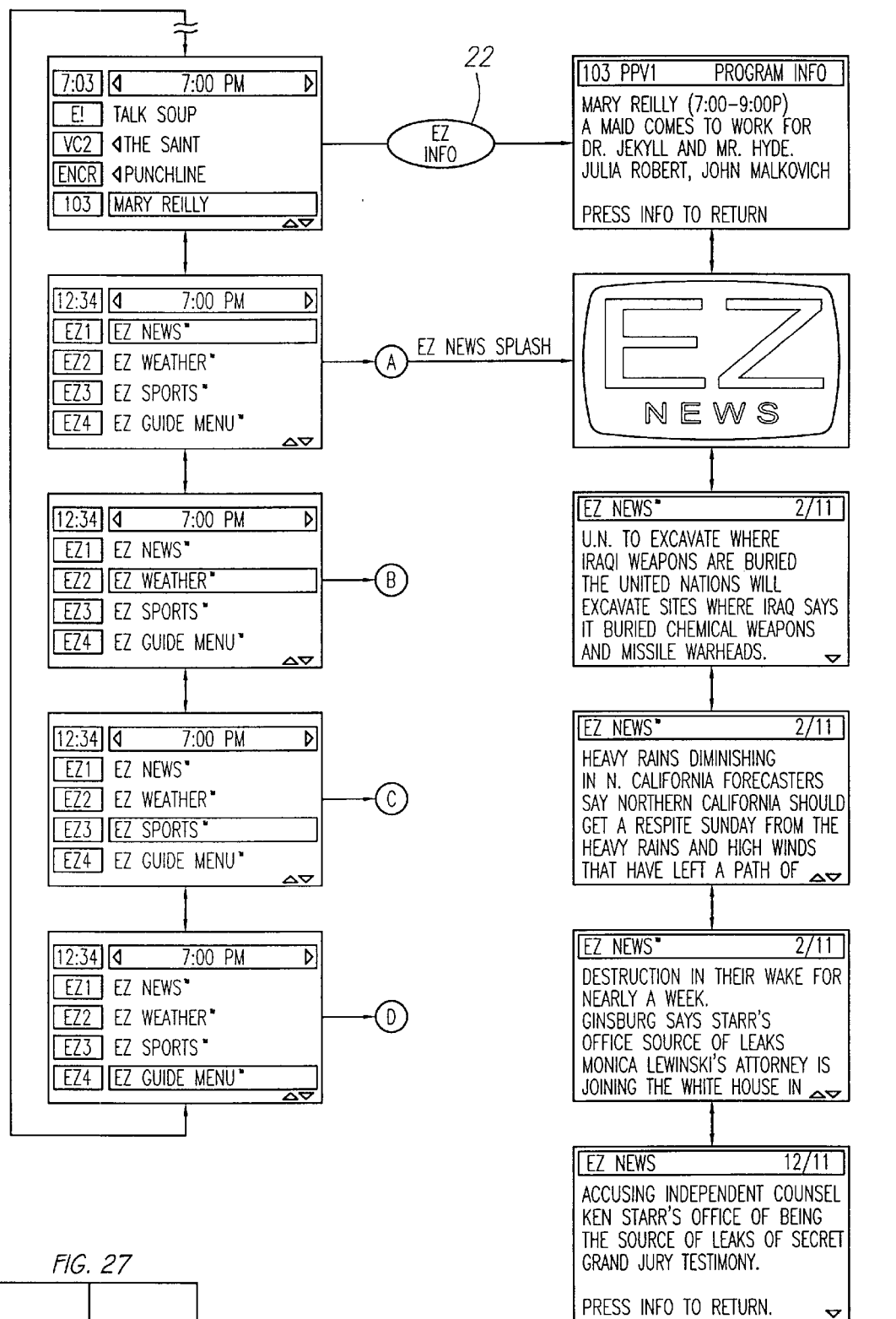
FIG. 27 shows a plurality of displays that may appear on the visual display when the program guide program is cycled through proprietary menus such as EZ News, EZ Weather, EZ Sports and an EZ Guide Menu.
Figure 27A:
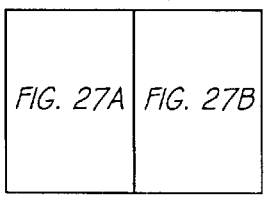
Figure 27B:
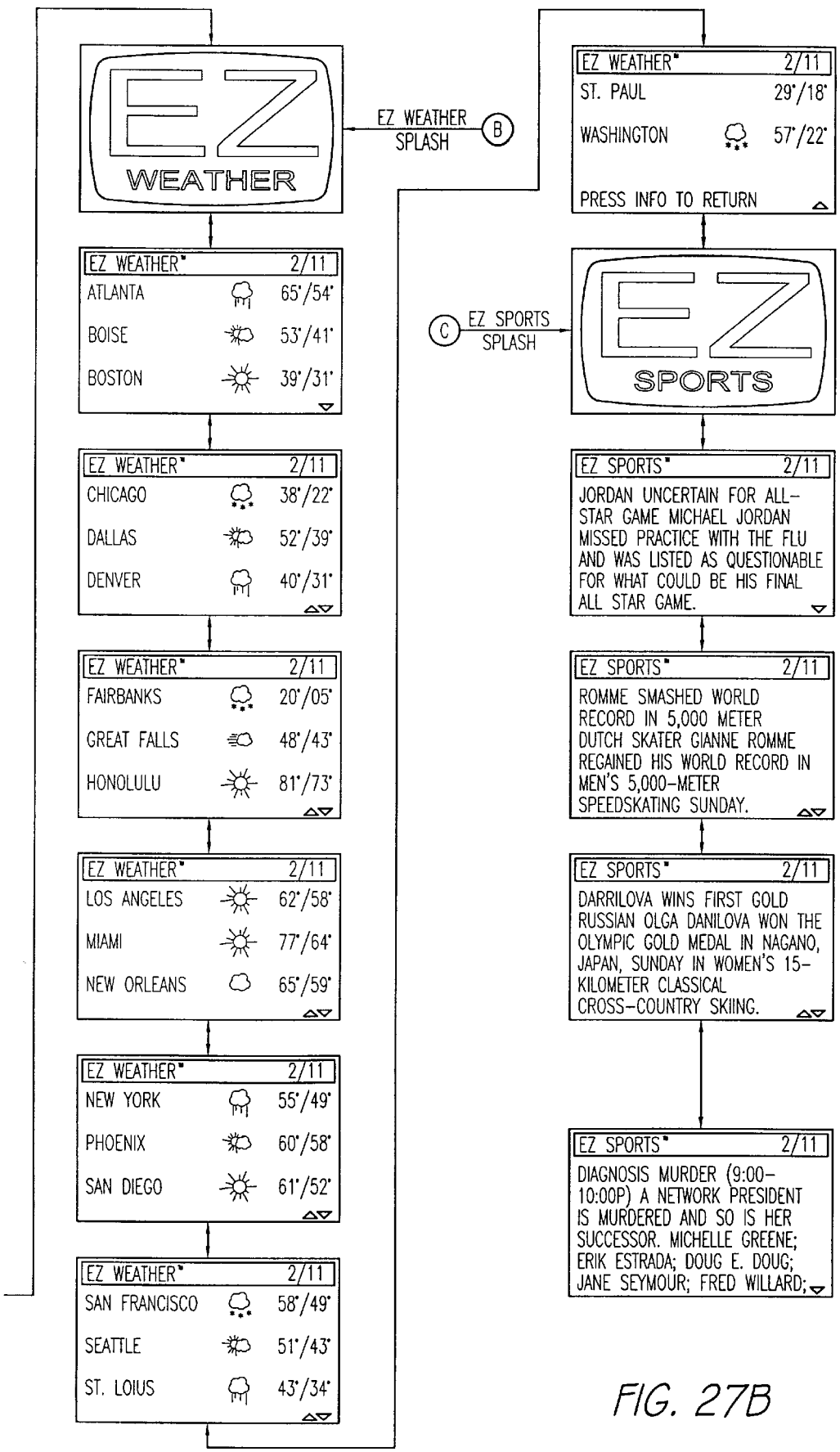

FIG. 27 shows the EZ channels mode for the EZ Guide flow chart that starts with a placeholder screen, the last screen in the channel map.

In FIG. 27 there is first shown a highlighted channel where one can go to an info screen upon pressing the EZ Info key 22, the number of which is determined by the channel map.

From the placeholder screen, one can go to the proprietary links or EZ channels and from there to a splash screen, e.g. EZ News, EZ Weather, EZ Sports, etc. This screen preferably will time-out after one second and transition or "wipe" to the first info screen for a selected EZ channel. If the EZ NAV key 20 up or down direction is pressed before the time-out, the transition preferably will change immediately.

Figure 28:
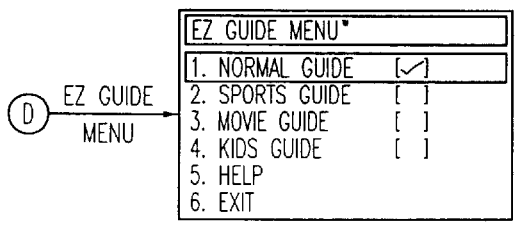
FIG. 28 shows a display that may be presented on the visual display when the EZ Guide Menu is highlighted and the EZ Info key is depressed.

From the EZ Guide Menu channel the screen goes to the screen shown in FIG. 28 where one can select a guide format as shown in FIGS. 13, 14 or 15.

Figure 29:
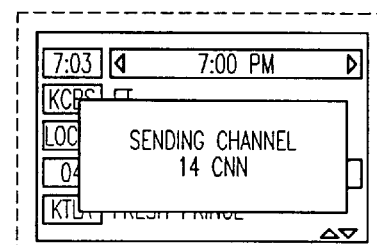
FIG. 29 shows three displays that may be presented on the visual display when the program guide is in the program information mode and the SEL key is depressed.
Figure 29:
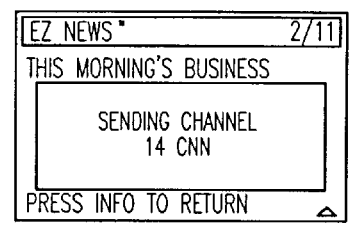
Figure 29:
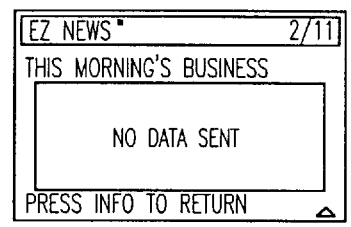

The three screens in FIG. 29 represent pop-up screens that may be displayed when the user presses the EZ NAV key 20 while on or inside an EZ channel. If the EZ channel is sponsored, the remote control 10 will tune the television to the sponsor's channel. If no channel is associated, then an error pop-up will be displayed.

Figure 30:
FIG. 30 provides an illustration of three displays that can appear on the visual display when a proprietary channel is depressed.
Figure 30:
Figure 30:
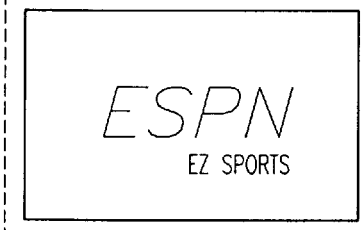

FIG. 30 shows three screens of sponsored channels representing an exemplary level of interactivity with the EZ channels.

Figure 31:
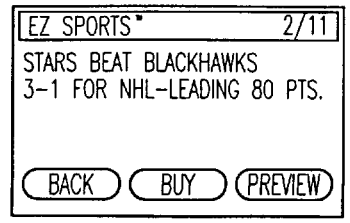
FIG. 31 is a display that can appear on the visual display for a splash screen from a proprietary menu that indicates a pay television event.

FIG. 31 is a splash-interactive (pay television) screen.

Figures 32, 32A:
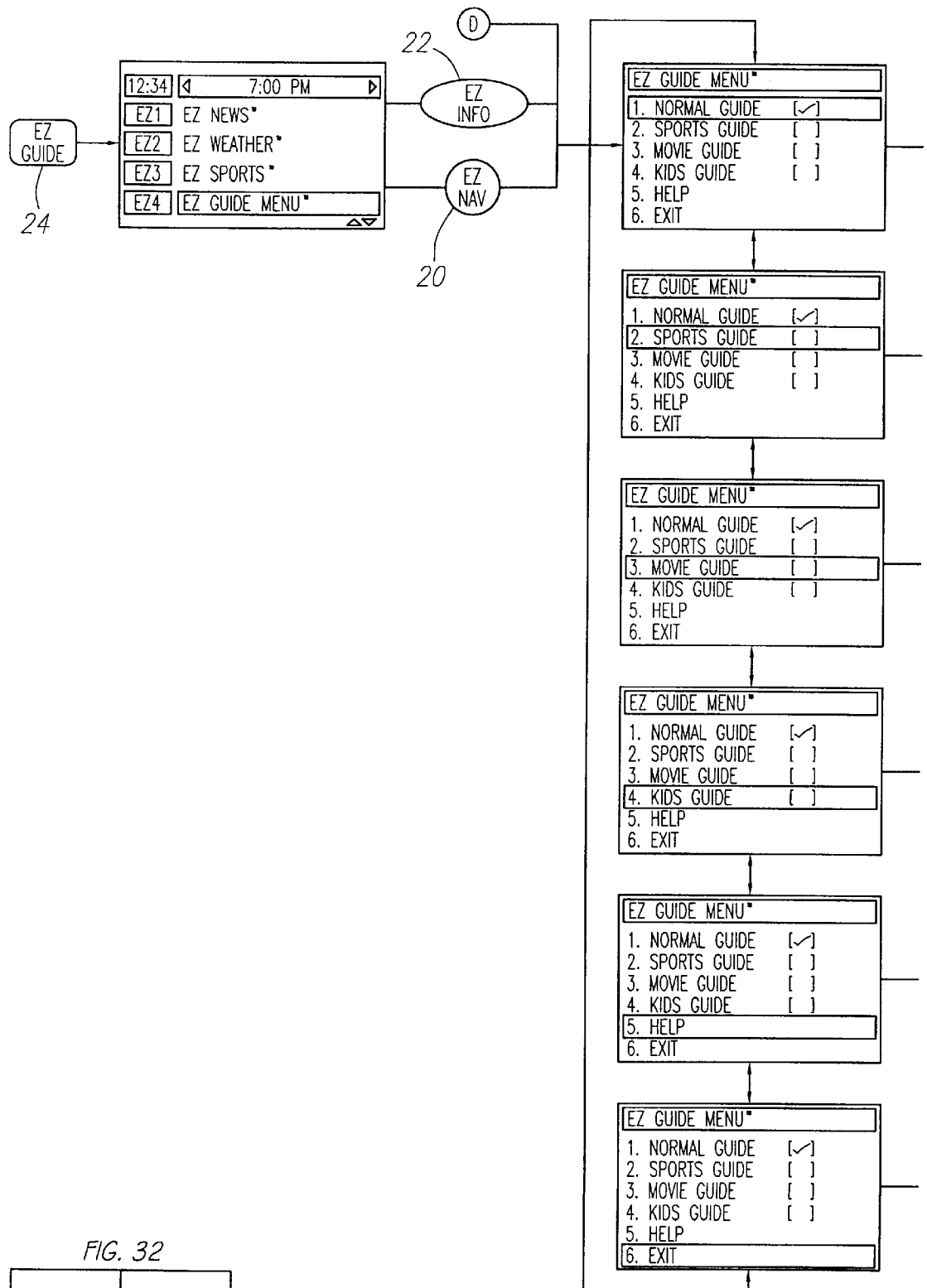
FIG. 32 shows a plurality of displays on the visual display which can be retrieved by the user for selecting categories and then selecting a timed event using the EZ Guide key, the EZ NAV key, and the EZ Info key.
Figure 32B:
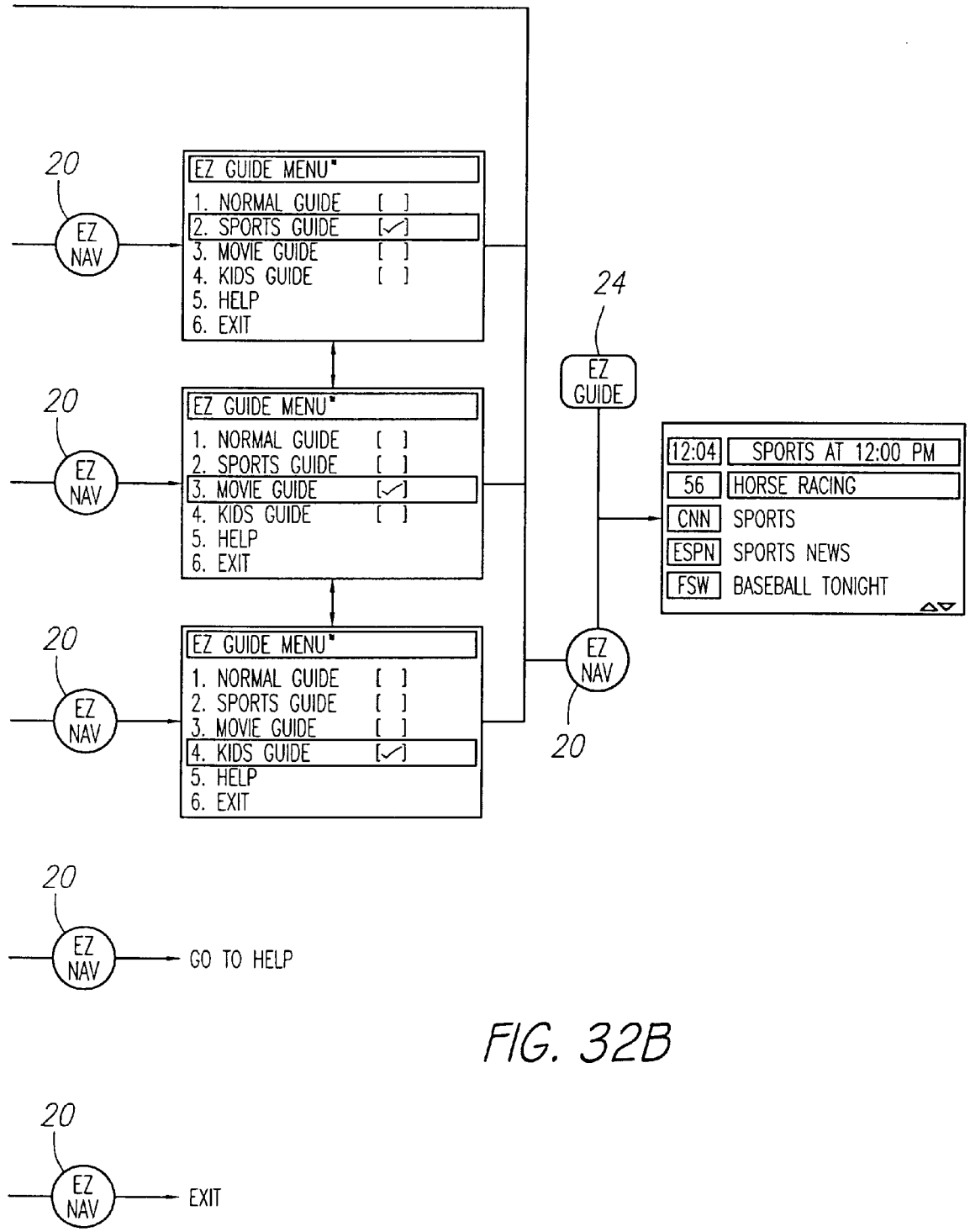

FIG. 32 is a flow chart of the EZ Guide Menu portion of the EZ Program Guide. The first screen shows a highlighted EZ Guide channel which goes to a current EZ Guide Menu where a user can sort the guide. The check mark on the screen indicates the currently active guide sort and can be changed by selecting a different guide sort.

As shown, one can select a particular guide sort by pressing an EZ NAV key 20 and then pressing the EZ Guide key 24 or the EZ NAV key 20.

Figure 33:
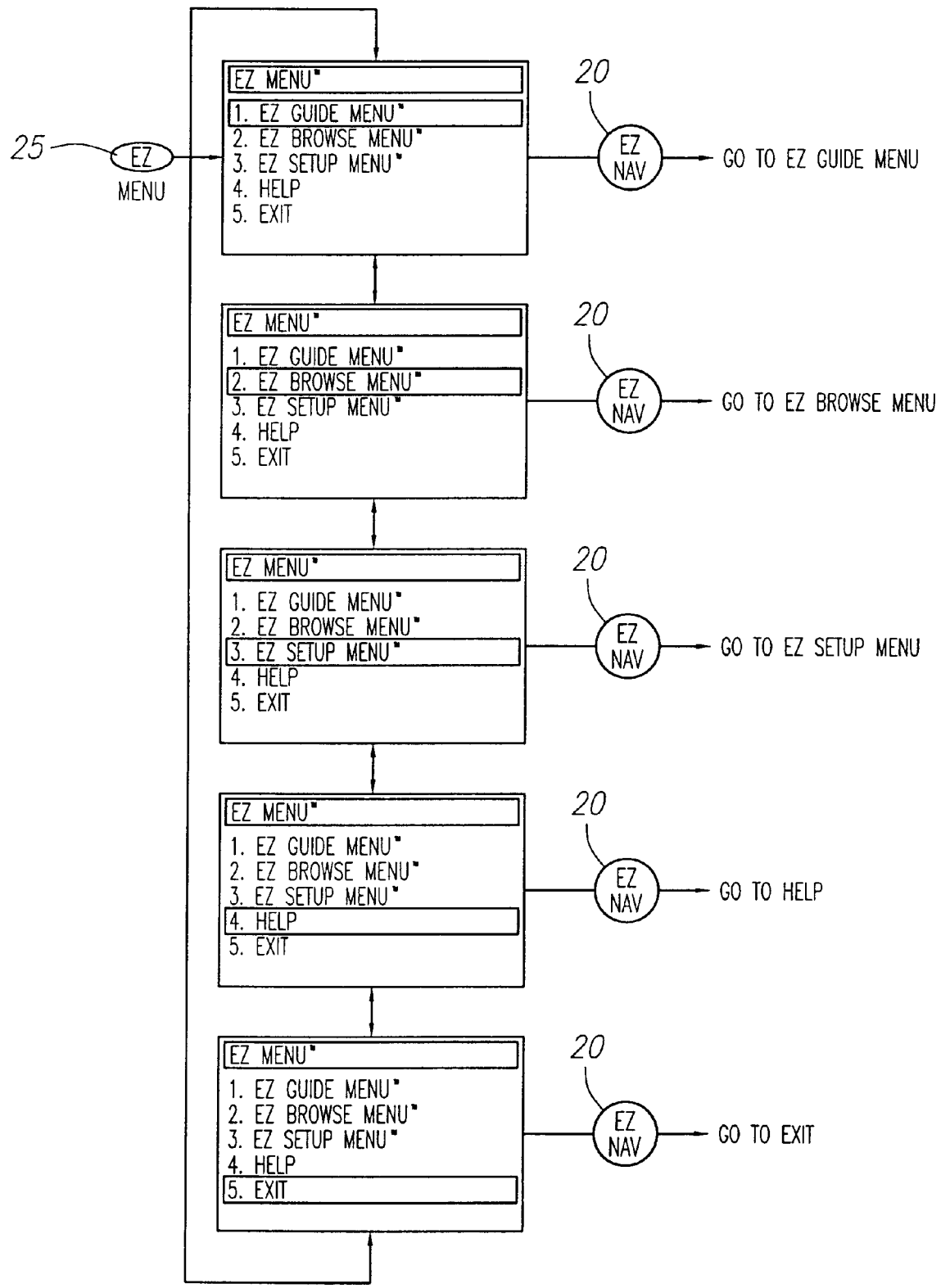
FIG. 33 illustrates a series of five displays that may appear on the visual display during use of the EZ Guide Menu.

FIG. 33 shows the current EZ Guide Menu and indicates the manner in which a user will set up the remote control unit 10. From the first screen, depression of the EZ NAV key 20 will go to A in FIG. 32.

Figure 34:
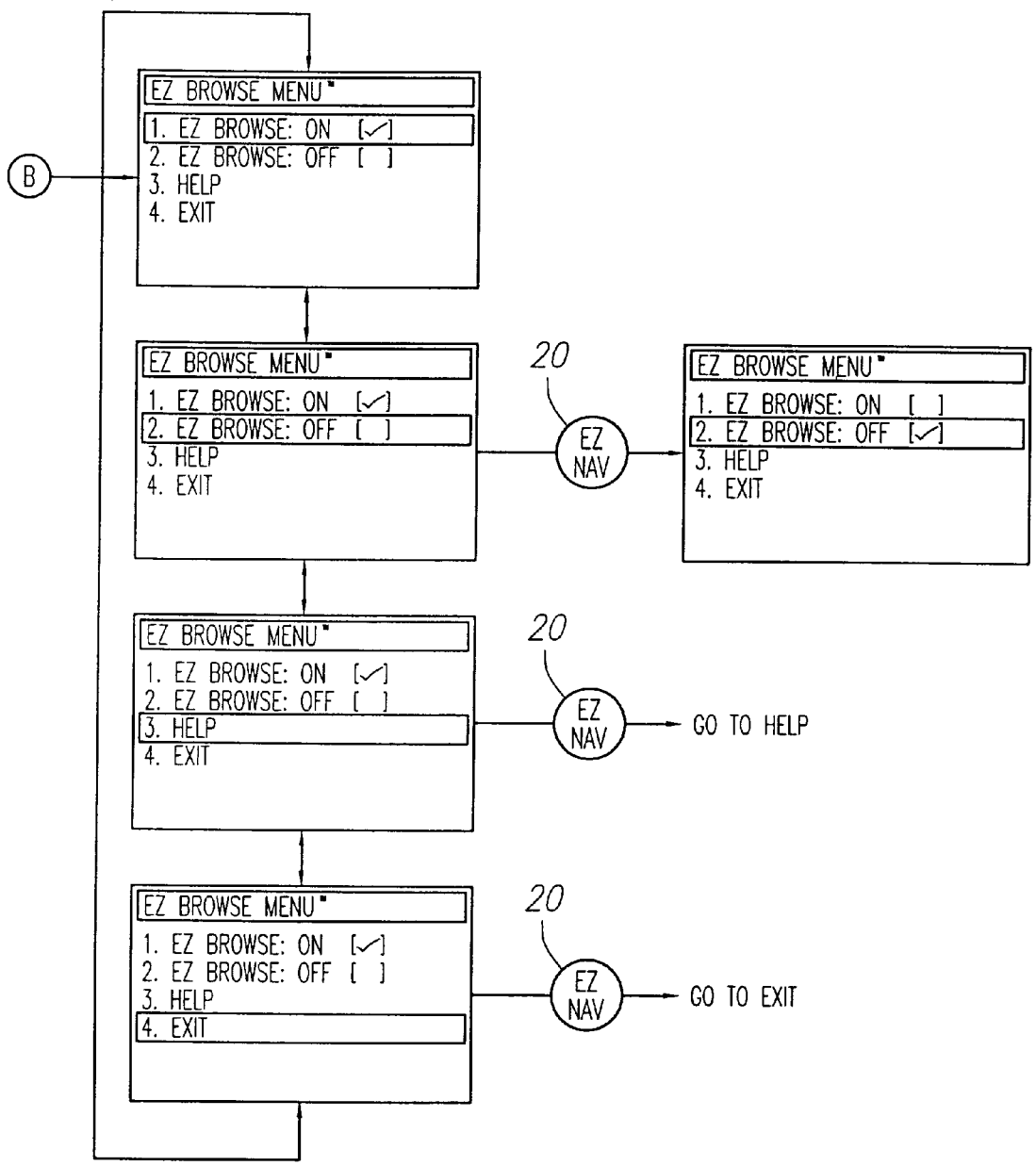
FIG. 34 illustrates five displays that may be retrieved and displayed for the EZ Guide Menu.

From the second screen, the pressing of the EZ NAV key 20 will take the user to B in FIG. 34. The other screens are self-explanatory.

FIG. 34 is the current EZ Browse menu where the first screen shows the user how to turn EZ Browse on and off. The check mark on the screen represents the current Browse state and can be changed by selecting a different Browse state. The other screens are self-explanatory.

While the invention is susceptible to various modifications and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

We claim:

1. A remote control device comprising:

a memory for storing an electronic programming guide, said electronic programming guide comprising a plurality of data fields for each of a plurality of program channels at each of a plurality of times;

a display for generating images representative of selected portions of said electronic programming guide;

a user input device for enabling input of channel selection and program guide navigation instructions into said remote control device;

an infrared transmitter circuit for transmitting channel selection control signals to a channel selecting apparatus; and a microprocessor coupled to said memory, said display, said user input device and said infrared transmitter circuit, wherein said microprocessor is configured to cause delivery of channel selection signals to said infrared transmitter circuit and to select portions of said electronic programming guide to be displayed on said display in response to signals received from said user input device, wherein said channel selection signals comprise specific channel identification macros, and wherein said microprocessor is configured to effect storage of channel selection history data within said memory at predetermined intervals.

2. A remote control device comprising:

a memory for storing data representative of an electronic programming guide, said electronic programming guide comprising a plurality of data fields for each of a plurality of program channels at each of a plurality of times, a display for depicting images representative of selected portions of said electronic program guide, a user input device for enabling entry of channel selection and program guide navigation instructions into said remote control device, a radio frequency receiver circuit for receiving signals comprising electronic programming guide data from a radio frequency source, an infrared transmitter circuit for transmitting channel selection control signals to a channel selection apparatus, and a microprocessor coupled to said memory, said display, said user input device, said radio frequency receiver circuit, and said infrared transmitter circuit, said microprocessor being configured to select portions of said electronic programming guide for depiction on said display in response to program navigation guide signals received from said user input device, to deliver signals representing channel selection macros to said infrared transmitter circuit in response to channel selection signals received from said user input device, and to cause channel selection history data to be stored within said memory at predetermined intervals.

3. The remote control device of claim 2, wherein a unique identification bit sequence is stored within said memory, and wherein said microprocessor is configured to effect downloading of said unique identification bit sequence and said channel selection history data to a data storage device in a predetermined manner.

4. An electronically addressable remote control with graphic display comprising:

a real time clock for generating signals indicative of a current time, a memory for storing data descriptive of an electronic programming guide, advertising data and serial number identification data, said electronic programming guide comprising a plurality of data fields for each of a plurality of program channels at each of a plurality of times, a user input device for entering channel selection and program guide navigation instructions into said remote control, a display for generating images in representative of selected sections of said electronic programming guide and selected advertisements defined by said advertising data, a radio frequency receiver circuit for receiving signals comprising said electronic programming guide and advertising data and selectively enabling delivery of said electronic programming guide and advertising data to said memory, an infrared transmitter circuit for transmitting channel selection signals to a channel selection apparatus, and a microprocessor coupled to said real time clock, said memory, said user input device, said display, said radio frequency receiver circuit and said infrared transmitter circuit, said microprocessor being configured to control said delivery of said electronic programming guide and advertising data from said radio frequency receiver circuit to said memory based upon a correlation between address data included within a received signal and said serial number identification data, and said microprocessor being configured to select sections of said electronic programming guide for display in response to said signals generated by said real time clock and signals received from said user input device.

5. A remote control device with advertising and program guide display comprising:

a housing having mounted therein means for receiving signals including advertising and program guide data, means for storing said advertising and program guide data, means for depicting selected subsets of said advertising and program guide data, means for selecting said subsets of said advertising and program guide data to be depicted, and means for communicating channel selection signals to a channel selecting apparatus, wherein said means for receiving and means for storing together comprise one of either a radio frequency receiver circuit or infrared receiver circuit, a microprocessor, a memory and a program for enabling said microprocessor to effect storage within said memory of said advertising and program guide received by said receiver circuit, and wherein said program enables said microprocessor to selectively store received advertising and program guide data based upon a correspondence between serial number identification data stored within said memory and address data included within said advertising and programming guide data.

6. A remote control device with advertising and program guide display comprising:

a housing having mounted therein means for receiving signals including advertising and program guide data, means for storing said advertising and program guide data, means for depicting selected subsets of said advertising and program guide data, means for selecting said subsets of said advertising and program guide data to be depicted, means for communicating channel selection signals to a channel selecting apparatus, and means for storing within said remote control and thereafter downloading to a remote storage device program selection history data.

7. The remote control device of claim 6, wherein said means for storing and downloading comprises a microprocessor, a user input device, a memory, a data link and a program for enabling said microprocessor to effect storage within said memory of channel selection macro and time data responsive to signals received from said user input device, and for enabling said microprocessor to effect downloading of said channel selection macro and time data to said remote storage device via said data link.

8. The remote control device of claim 7, wherein said data link comprises a modem, a RS-232 port, a RF data link or an infrared data link.

9. A remote control for operating a consumer electronic device, said remote control comprising: a housing mounting a visual display; a keyboard including a plurality of keys; electrical circuitry in said housing including a microprocessor, at least one of an IR or RF receiver coupled to said microprocessor for receiving program data, keyboard circuitry coupled between said microprocessor and said keyboard, memory means coupled to said microprocessor, and IR transmitting means coupled to said microprocessor; and program guide software stored in said memory means for displaying on said visual display, upon actuation of one or more of said keys, a one day program guide contained in the program data received by said receiver, wherein said program guide software includes means for querying a host device for date/time information.

10. The remote control of claim 9 further comprising means for displaying on the visual display an advertisement to replace the batteries with a specific brand of battery, wherein the program guide information data received is in a compressed format and said program guide software includes instructions for decompressing said program guide information data and displaying it.

11. The remote control of claim 9 further comprising motion detection means for placing the remote control in a given state when it is picked up by a user.

12. The remote control of claim 9 further comprising an interactive application program, which is, capable of running on said remote control for setting up said remote control using names of manufacturers instead of model numbers or arbitrary code numbers.

13. A method for gathering data indicative of one or more television viewing habits of a plurality of television viewers, said method comprising the steps of:

providing one or more viewers with remote control units capable of operating channel selection devices of the viewers, configuring said remote control units to force tune said channel selection devices as said one or more viewers use said remote control devices to select channels for viewing, enabling said remote control units to store in memory program selection history data for a predetermined period of time, and enabling said remote control units to download said program selection history data to a program history database at predetermined intervals.

14. The method of claim 13, wherein said program selection history data comprises a date stamp, a time stamp and a program channel selection stamp.

15. The method of claim 13, wherein said remote control units are capable of bidirectional communication with a host system, said host system maintains said program history database, and said remote control units download said program selection history data to said program history database automatically at said predetermined intervals.

16. The method of claim 15, wherein said predetermined intervals comprise daily or weekly intervals.

17. The method of claim 13, wherein said step of enabling said remote control units to download said program selection history data to a program history database includes the steps of establishing a communication link between said remote control devices and respective personal computer units, delivering said program selection history data from said remote control units to said personal computing units, and causing said personal computing units to download said program selection history data to a host system that maintains said program history database.

18. A method for gathering data indicative of one or more content selection preferences of a plurality of content recipients, said method comprising the steps of:

providing said content recipients with remote control units capable of interacting with and controlling a plurality of television channel selection devices and internet content selection devices of said content recipients, configuring said remote control units to force tune said channel selection devices and said internet content selection devices as said content recipients use said remote control devices to select content for viewing, enabling said remote control units to store in memory content selection history data for a predetermined period of time, and enabling said remote control units to download said content selection history data to a content selection history database at predetermined intervals.

19. The method of claim 18, wherein said remote control units are capable of bi-directional communication with a host system, said host system maintains said content selection history database, and said remote control units download said content selection history data to said content selection history database automatically at said predetermined intervals.

20. The method of claim 19, wherein said predetermined intervals comp rise daily or weekly intervals.

* * * * *